(12) United States Patent
Hieda et al.

(10) Patent No.: US 7,686,972 B2
(45) Date of Patent: Mar. 30, 2010

(54) METHOD FOR MANUFACTURING MAGNETIC RECORDING MEDIUM

(75) Inventors: Hiroyuki Hieda, Yokohama (JP); Yoshiyuki Kamata, Tokyo (JP); Satoshi Shirotori, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 93 days.

(21) Appl. No.: 11/705,037

(22) Filed: Feb. 12, 2007

(65) Prior Publication Data
US 2007/0207263 A1    Sep. 6, 2007

(30) Foreign Application Priority Data
Feb. 16, 2006   (JP) .............................. 2006-039623

(51) Int. Cl.
*B44C 1/22* (2006.01)
*C03C 15/00* (2006.01)
*C03C 25/68* (2006.01)
*C23F 1/00* (2006.01)

(52) U.S. Cl. ............................. 216/67; 216/22; 216/63; 427/127; 427/355

(58) Field of Classification Search .................. 216/67, 216/63, 22; 427/127, 355
See application file for complete search history.

(56) References Cited

U.S. PATENT DOCUMENTS

| | | | | |
|---|---|---|---|---|
| 4,944,961 | A * | 7/1990 | Lu et al. | ..................... 427/531 |
| 6,748,865 | B2 | 6/2004 | Sakurai et al. | |
| 7,105,280 | B1 * | 9/2006 | Deeman et al. | ............. 430/320 |
| 2004/0191577 | A1 | 9/2004 | Suwa et al. | |
| 2004/0209123 | A1 * | 10/2004 | Bajorek et al. | ......... 428/694 TP |
| 2005/0161427 | A1 * | 7/2005 | Okawa et al. | ................. 216/20 |
| 2005/0282038 | A1 | 12/2005 | Yamamoto et al. | |
| 2005/0284320 | A1 | 12/2005 | Sakuarai et al. | |
| 2006/0012904 | A1 | 1/2006 | Naruse et al. | |
| 2007/0065588 | A1 | 3/2007 | Kihara et al. | |
| 2007/0070548 | A1 | 3/2007 | Shirotori et al. | |
| 2007/0090087 | A1 | 4/2007 | Shirotori et al. | |
| 2007/0207263 | A1 | 9/2007 | Hieda et al. | |

FOREIGN PATENT DOCUMENTS

| JP | 60-211939 | 10/1985 |
|---|---|---|
| JP | 62-161148 | 7/1987 |

(Continued)

OTHER PUBLICATIONS

Katsuyuki Naito (Chaos 15(4) (Dec. 2005), pp. 047507-1 to 047507-7).*

(Continued)

*Primary Examiner*—Nadine G Norton
*Assistant Examiner*—Mahmoud Dahimene
(74) *Attorney, Agent, or Firm*—Nixon & Vanderhye, PC

(57) ABSTRACT

It is made possible to manufacturing a magnetic recording medium capable of high-density recording at low cost. A method for manufacturing a magnetic recording medium, includes: forming a magnetic film on a substrate; and forming a pattern transfer film, into which a concavo-convex pattern of a magnetic recording medium is to be transferred by imprinting, by vapor-depositing a material for forming the pattern transfer film onto the magnetic film while heating the material at a temperature of 100° C. to 400° C. in a vacuum of $1 \times 10^{-3}$ Torr or less.

5 Claims, 29 Drawing Sheets

FOREIGN PATENT DOCUMENTS

| | | |
|---|---|---|
| JP | 2-90172 | 3/1990 |
| JP | 2001-044794 | 2/2001 |
| JP | 2003-332313 | 11/2003 |
| JP | 2004-295989 | 10/2004 |
| JP | 2005-023358 | 1/2005 |
| JP | 2005-056547 | 3/2005 |
| JP | 2006-012216 | 1/2006 |
| JP | 2006-031848 | 2/2006 |
| JP | 2006-048751 | 2/2006 |

OTHER PUBLICATIONS

Jian Wang et al.; "Direct nanoimprint of submicron organic light-emitting structures"; Applied Physics Letters; vol. 75, No. 18; Nov. 1, 1999; pp. 2767-2769.

Dario Pisignano et al.; "Room-Temperature Nanoimprint Lithography of Non-thermoplastic Organic Films"; Advanced Materials; No. 6; Mar. 18, 2004; pp. 525-529.

Atsushi Yokoo et al.; "Organic Photonic Crystal Band Edge Laser Fabricated by Direct Nanoprinting"; Japanese Journal of Applied Physics, vol. 43, No. 6B; 2004; pp. 4009-4011.

Office Action dated Mar. 14, 2008 in Japanese Application 039623/2006 and English-language translation.

Hattori et al., "Fabrication of Discrete Track Perpendicular Media for High Recording Density"; IEEE Transactions on Magnetics, vol. 40, No. 4; Jul. 2004; pp. 2510-2515.

Decision of rejection in Japanese Application No. 2006-039623, dated Aug. 1, 2008 and English-language translation thereof.

* cited by examiner

APPLICATION OF HEAT (R REPRESENTS A HYDROGEN ATOM OR AN ALKYL GROUP)

[Me REPRESENTS A METHYL GROUP AND R REPRESENTS A HYDROGEN ATOM OR AN ALKYL GROUP]

p-NITROCYANOBENZENE (a)

1,3-DINITROBENZENE (b)

TNF (c)

1,3,5-TRINITROBENZENE (d)

p-DINITROBENZENE (e)

(a)

(R5 TO R8 EACH REPRESENT A HYDROGEN ATOM, A HALOGEN ATOM, AN ALKYL GROUP, AN ALKENYL GROUP, AN ARYL GROUP, AN ALKYLOXY GROUP, AN ALKYLTHIO GROUP, AN ALKYLOXYCARBONYL GROUP, A CYANO GROUP, A NITRO GROUP, A HYDROXYL GROUP, AN AMINO GROUP, A CARBOXYL GROUP, AN ACETYL GROUP, OR A FORMYL GROUP)

(b)

(R REPRESENTS AN ALKYL GROUP OR AN ARYL GROUP)

(a)

(b)

(c)

(d)

METHOD FOR MANUFACTURING MAGNETIC RECORDING MEDIUM

CROSS-REFERENCE TO RELATED APPLICATION

This application is based upon and claims the benefit of priority from prior Japanese Patent Application No. 2006-39623 filed on Feb. 16, 2006 in Japan, the entire contents of which are incorporated herein by reference.

BACKGROUND OF THE INVENTION

1. Field of the Invention

The present invention relates to a method for manufacturing a magnetic recording medium.

2. Related Art

Magnetic recording devices such as hard disk drives (HDDs) have come into popular and widespread use as a result of spread of personal computers. In recent years, the advent of the Internet and DVDs providing high-resolution image information has rapidly increased the amount of information to be processed by magnetic recording devices, and therefore there has been a growing demand for larger-capacity magnetic recording devices. Further, miniaturization of HDDs to be installed in mobile devices such as mobile phones, car navigation systems, and MP3 players is progressing, and therefore demand for higher-density HDDs is also growing. It can be said that such a situation has been produced by a significant increase in recording density of HDDs. The recording density of HDDs can be increased by forming smaller magnetic recording marks. Formation of smaller magnetic recording marks requires a smaller write head, a reproducing head capable of detecting a smaller magnetic field, and a magnetic recording medium on which smaller magnetic recording marks can be written stably.

Conventionally, formation of smaller magnetic recording marks on a magnetic recording medium has been achieved by reducing the particle size of magnetic particles constituting a magnetic recording layer formed by sputtering. However, the use of smaller magnetic particles makes it more difficult to solve a problem of so-called thermal fluctuation caused by deterioration of thermal stability of micro magnetic particles. A problem of thermal fluctuation can be solved by using a magnetic material having a high coercive force to improve the thermal stability of the magnetic material itself. This, however, requires a stronger write magnetic field in spite of the fact that a write magnetic field generated by a write head is approaching its limit.

In view of the above fact, there has been proposed a patterned medium having a structure significantly different from that of a conventional magnetic recording medium (see, for example, JP-A 2004-295989 (KOKAI)). Such a patterned medium has recording cells as minimum recording units. The recording cells are previously formed by lithography so as to be arranged in recording tracks. In the case of a conventional magnetic recording medium, even when a minimum recording mark is written on a magnetic recording layer formed by sputtering, the mark is written on a cluster of a few dozen to a few hundred magnetic particles. On the other hand, in the case of a patterned medium, the size of each magnetic particle can be increased to the size of a recording cell formed by lithography, which makes it possible to ultimately solve a problem of thermal fluctuation resulting from the particle size reduction of magnetic particles.

Meanwhile, manufacturing of patterned media requires an etching mask for etching a magnetic film. Usually, such an etching mask is formed by exposing a coated film formed by coating a solution of a polymeric material to an energy beam such as a light or electron beam to form a pattern. In the case of a so-called imprint method, a pattern is formed by pressing a concavo-convex pattern against a coated film of a polymeric material formed in the same manner as described above.

On the other hand, in the case of manufacturing of media for HDDs, a vacuum environment is maintained until the formation of a protection layer is completed, which allows very high-throughput and low-cost media production.

As described above, since the manufacturing of patterned media uses a coated film, it is necessary to take a disk out of a vacuum environment in the course of production. This reduces throughput, thereby making it difficult to achieve low-cost disk production.

Further, it is very difficult to form a coated film having a uniform thickness over the entire surface of a disk. Particularly, the thickness of the coated film varies widely in a disk edge portion so that it is impossible to carry out uniform etching in the disk edge portion.

Furthermore, when a coated film is formed on one surface of a disk, it is inevitable that in the disk edge portion, the material of the coated film reaches the other surface onto which the material is not applied. Therefore, it is very difficult to form a pattern on the entire surface of each of both sides of the disk, which makes it impossible to achieve high-density recording.

The etching mask must be completely removed before a recording medium is completed. If the etching mask remains in the recording medium, a head cannot come sufficiently close to the medium. This makes it difficult to carry out writing and reading of micro recording marks, that is, it becomes difficult to achieve the intended purpose of patterned media. Usually, a resist material used in producing electronic devices is removed by wet treatment using an appropriate solvent or releasing agent or by oxygen plasma treatment. In a case where wet treatment is carried out using a solvent or a releasing agent, it is necessary to take a disk out of a vacuum environment in the course of production. This reduces throughput, thereby making it impossible to achieve a low-cost disk production process. On the other hand, in a case where oxygen plasma treatment is carried out, there is a possibility that a magnetic film is damaged so that an SN ratio is degraded.

As has been described above, according to a conventional method for manufacturing a patterned medium, it is difficult to produce a medium capable of high-density recording at low cost.

SUMMARY OF THE INVENTION

It is an object of the present invention to provide a method for manufacturing a magnetic recording medium capable of high-density recording at low cost.

A method for manufacturing a magnetic recording medium according to an aspect of the present invention includes: forming a magnetic film on a substrate; and forming a pattern transfer film, into which a concavo-convex pattern of a magnetic recording medium is to be transferred by imprinting, by vapor-depositing a material for forming the pattern transfer film onto the magnetic film while heating the material at a temperature of 100° C. to 400° C. in a vacuum of $1\times10^{-3}$ Torr or less.

DETAILED DESCRIPTION OF THE INVENTION

Hereinbelow, a method for manufacturing a magnetic recording medium according to one embodiment of the present invention will be described.

Figure 1A:
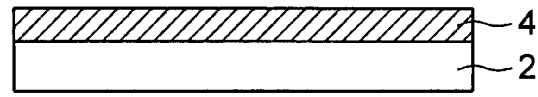
FIGS. 1A to 1D are cross-sectional views showing the steps of a method for manufacturing a magnetic recording medium according to one embodiment of the present invention.
Figure 1B:
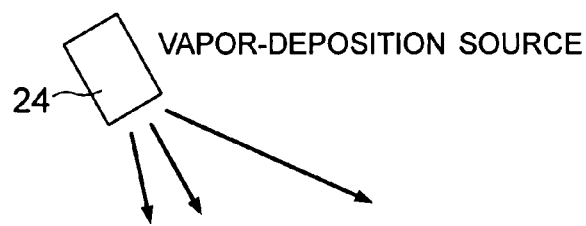
Figure 1C:
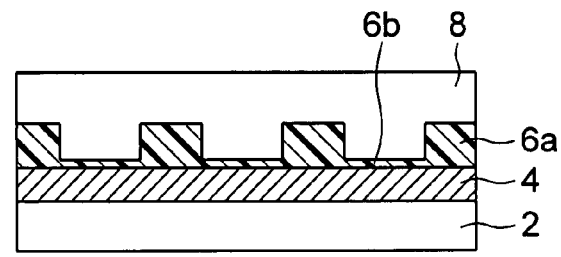
Figure 1D:
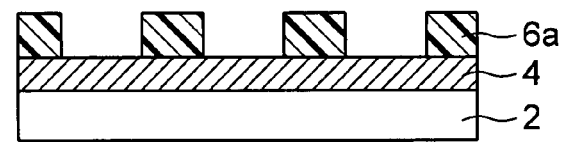
Figure 2A:
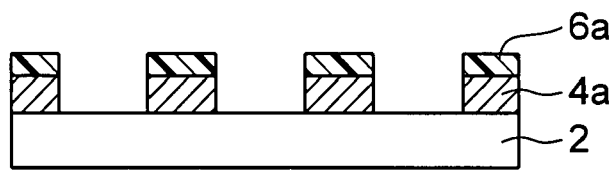
FIGS. 2A to 2E are cross-sectional views showing the steps of the method for manufacturing a magnetic recording medium according to one embodiment of the present invention.
Figure 2B:
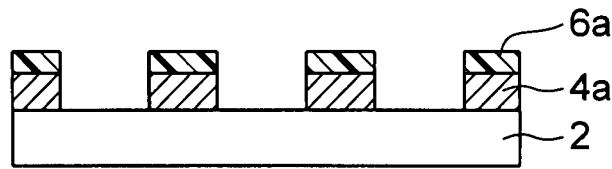
Figure 2C:
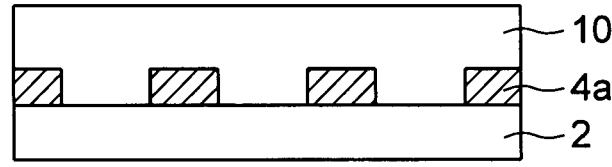
Figure 2D:
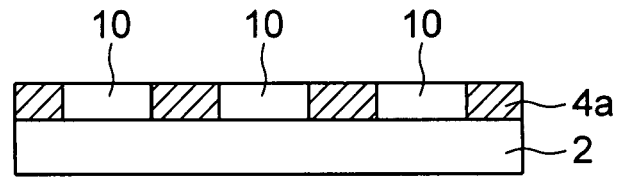
Figure 2E:
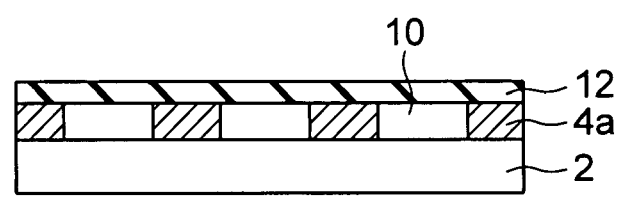
Figure 3:
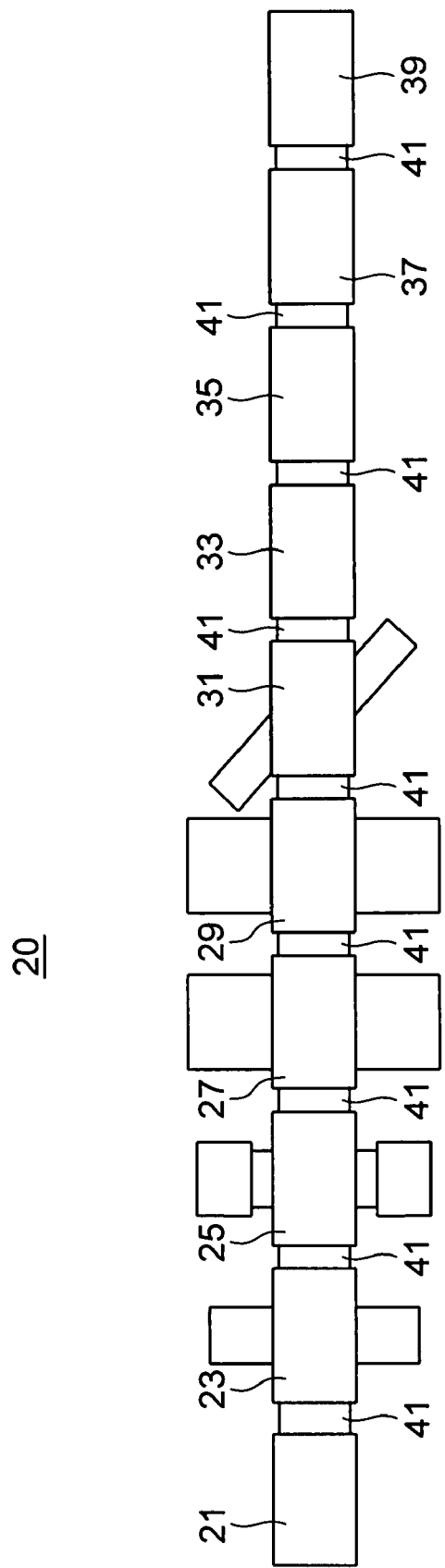
FIG. 3 is a block diagram showing a manufacturing to be used for carrying out the manufacturing method according to one embodiment of the present invention.

FIGS. 1A to 2E are cross-sectional views showing the steps of the method for manufacturing a magnetic recording medium according to the present embodiment, and FIG. 3 is a block diagram showing a manufacturing apparatus 20 to be used for carrying out the method for manufacturing a magnetic recording medium according to the present embodiment. A magnetic recording medium to be manufactured according to the manufacturing method of the present embodiment is a patterned medium. The manufacturing apparatus 20 includes a film formation chamber 21 in which two or more film formation apparatuses are connected to each other, a film formation chamber 23, an imprinting chamber 25, a dry etching chamber 27, a dry etching chamber 29, an ion beam irradiation chamber 31, a lamp annealing chamber 33, a film formation chamber 35, a dry etching chamber 37, and a film formation chamber 39. Each chamber is separated from the other chambers by gate valves 41. Every time treatment is completed in each chamber, the gate valve 41 provided between adjacent two chambers is opened to transport a disk fixed to its special carrier into the next chamber for carrying out subsequent treatment, and then the gate valve 41 is closed. In this way, production of a magnetic recording medium proceeds. It is to be noted that in each chamber, treatment is carried out in a vacuum.

First, a substrate (disk) 2 fixed to its special carrier (not shown in the drawings) is transported into the film formation chamber 21. In this film formation chamber 21, as shown in FIG. 1A, a magnetic recording film 4 is formed on the substrate 2. Generally, a magnetic recording medium usually has two or more metallic or dielectric thin films formed as foundation layers of a magnetic recording film for the purpose of, for example, controlling the crystalline orientation of the magnetic recording film. In the case of a perpendicular magnetic recording medium, a soft magnetic foundation film is generally formed under a magnetic recording film. It is to be noted that in this embodiment, the substrate 2 has a disk shape, and the diameter thereof is 0.85, 1, 1.8, 2.5, or 3 inches. However, the shape of the substrate 2 is not limited to a disk shape. The flatness of the substrate 2 is preferably as high as possible. The magnetic recording film 4 formed on the substrate 2 is made of a ferromagnetic material. More specifically, the ferromagnetic material contains at least one ferromagnetic element selected from Co, Fe, and Ni. Such a ferromagnetic material may further contain at least one element such as C, Si, Cr, Pt, Pd, Ta, Tb, Sm, or Gd. The ferromagnetic material is formed into a film on the substrate 2 by sputtering. The magnetic recording film 4 may have a multilayer structure comprising two or more layers of different materials selected from the above-mentioned ones. In this case, a film formed of a non-magnetic metal other than Co, Fe, and Ni or a metal oxide may be interposed between each pair of adjacent two layers.

Figure 4:
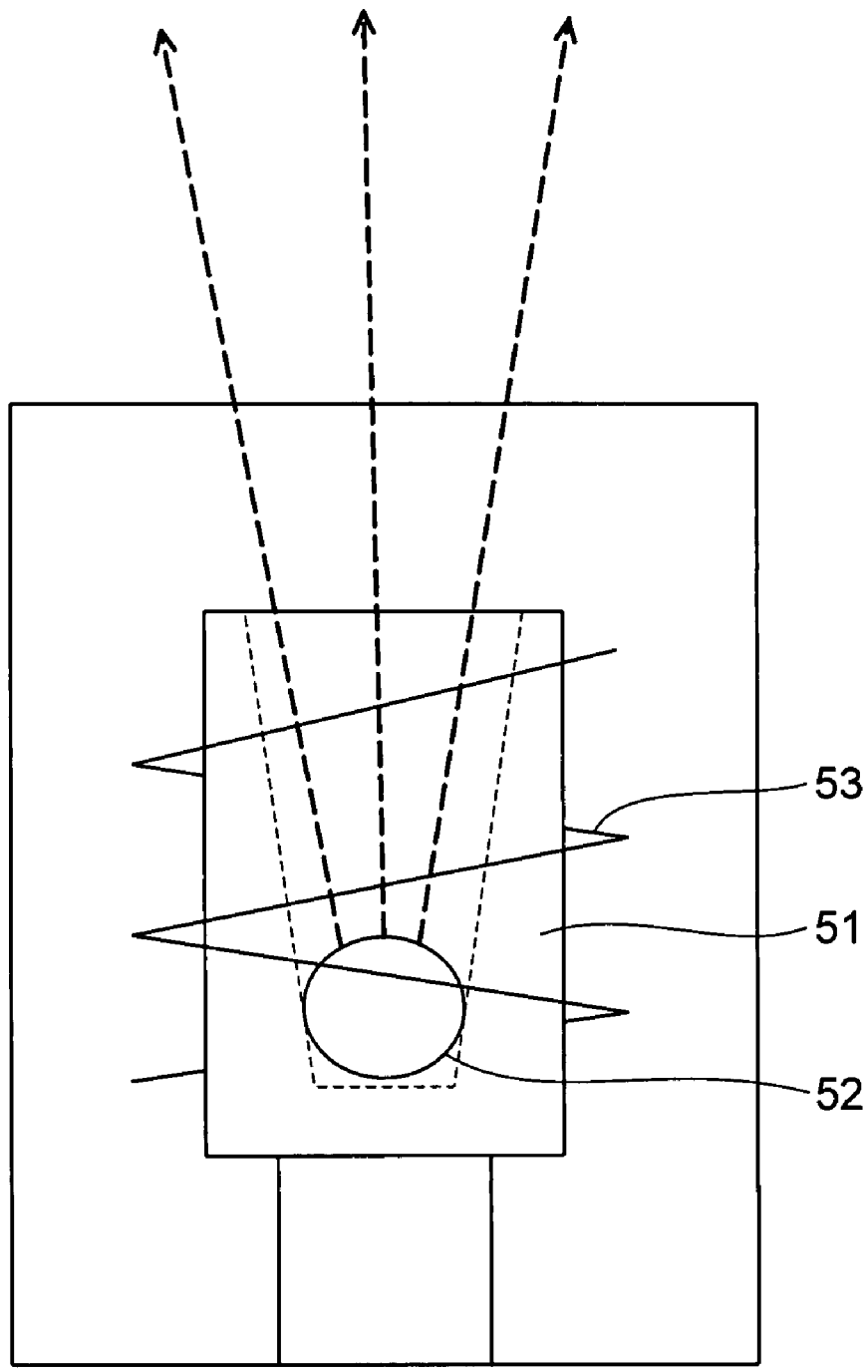
FIG. 4 is a schematic diagram showing the structure of a chamber for forming a pattern transfer film.

Next, the substrate 2 having the magnetic recording film 4 formed thereon is transported into the film formation chamber 23. As shown in FIG. 1B, a pattern transfer film 6 is formed on the magnetic recording film 4. Into the pattern transfer film 6, an etching mask pattern is to be transferred in the next step of nanoimprinting. The pattern transfer film 6 is formed by vacuum deposition. The material of the pattern transfer film 6 is removed from the substrate 2 by heating in a later step. Therefore, the pattern transfer film 6 is formed of a material that can be vaporized by heating at a temperature of 100° C. to 400° C. As such a material for forming the pattern transfer film 6, a low-molecular-weight organic material containing an aromatic compound is preferably used. By using such an organic material containing an aromatic compound, it is possible to enhance the etching resistance of the pattern transfer film 6. As described above, the pattern transfer film 6 made of such a low-molecular-weight organic material can be formed by vacuum deposition. For example, as shown in FIG. 4, a low-molecular-weight aromatic organic material 52 is placed in a crucible 51, and is then heated by the passage of electric current through a heating filament 53 surrounding the crucible 51. As a result, the aromatic organic material 52 is easily vaporized by radiant heat, and the resulting stream of vaporized molecules impinges on the substrate 2, thereby enabling the aromatic organic material 52 to be vapor-deposited onto the substrate 2. In this regard, it is to be noted that a shutter may be provided for an opening of the crucible 51. Further, a loading chamber and an unloading chamber separated by gate valve may be provided for preventing the diffusion of molecules of the vaporized low-molecular-weight aromatic organic material into the chambers 21 and 25.

When the low-molecular-weight organic material is vaporized in a vacuum of $1 \times 10^{-3}$ Torr or less, molecules thereof are vapor-deposited onto the substrate at a high deposition rate, thereby preventing the deterioration of the material during vapor deposition. If the low-molecular-weight organic material is vaporized in a non-vacuum atmosphere, the material is deteriorated by reaction with oxygen contained in the non-vacuum atmosphere due to heating during vapor deposition. This produces some adverse effects such as lowering of the etching resistance of the resulting etching mask used for etching the magnetic recording film and the occurrence of variations in the temperature of heating required for removing the etching mask. More preferably, vapor deposition of the low-molecular-weight organic material is carried out in a vacuum of $1 \times 10^{-5}$ Torr or less. Further, when the low-molecular-weight organic material is vaporized in a vacuum of $1 \times 10^{-3}$ Torr or less, vapor deposition of the low-molecular-weight organic material onto the back surface (that is, a surface opposite to a surface on which a pattern transfer film is to be formed) of the substrate 2 is prevented. This makes it possible to form a pattern of the patterned medium on each of both surfaces of the substrate (disk). Preferred examples of a material for forming the pattern transfer film 6 will be described later in detail. It is to be noted that when the pattern transfer film 6 is formed by vacuum deposition, the material of the pattern transfer film 6 is heated at a temperature of 100° C. to 400° C.

Next, the substrate (disk) 2 having the pattern transfer film 6 formed thereon in such a manner as described above is transported into the imprinting chamber 25. As shown in FIG. 1C, in this imprinting chamber 25, an etching mask pattern 6a is formed in the pattern transfer film 6. A stamper 8 having a concavo-convex pattern that is reverse to a concavo-convex pattern of the patterned medium is pressed against the pattern transfer film 6 formed on the substrate 2 to transfer the etching mask pattern 6a into the pattern transfer film 6. The concavo-convex pattern of the patterned medium comprises a data area in which recording cells parallel to each other are arranged in recording tracks and a servo information area on which information such as positioning information and addresses is formed. The concavo-convex pattern to be transferred into the pattern transfer film 6 may be a pattern of a discrete track recording (DTR)-type patterned medium in which recording tracks are physically separated from each other.

Figure 5:
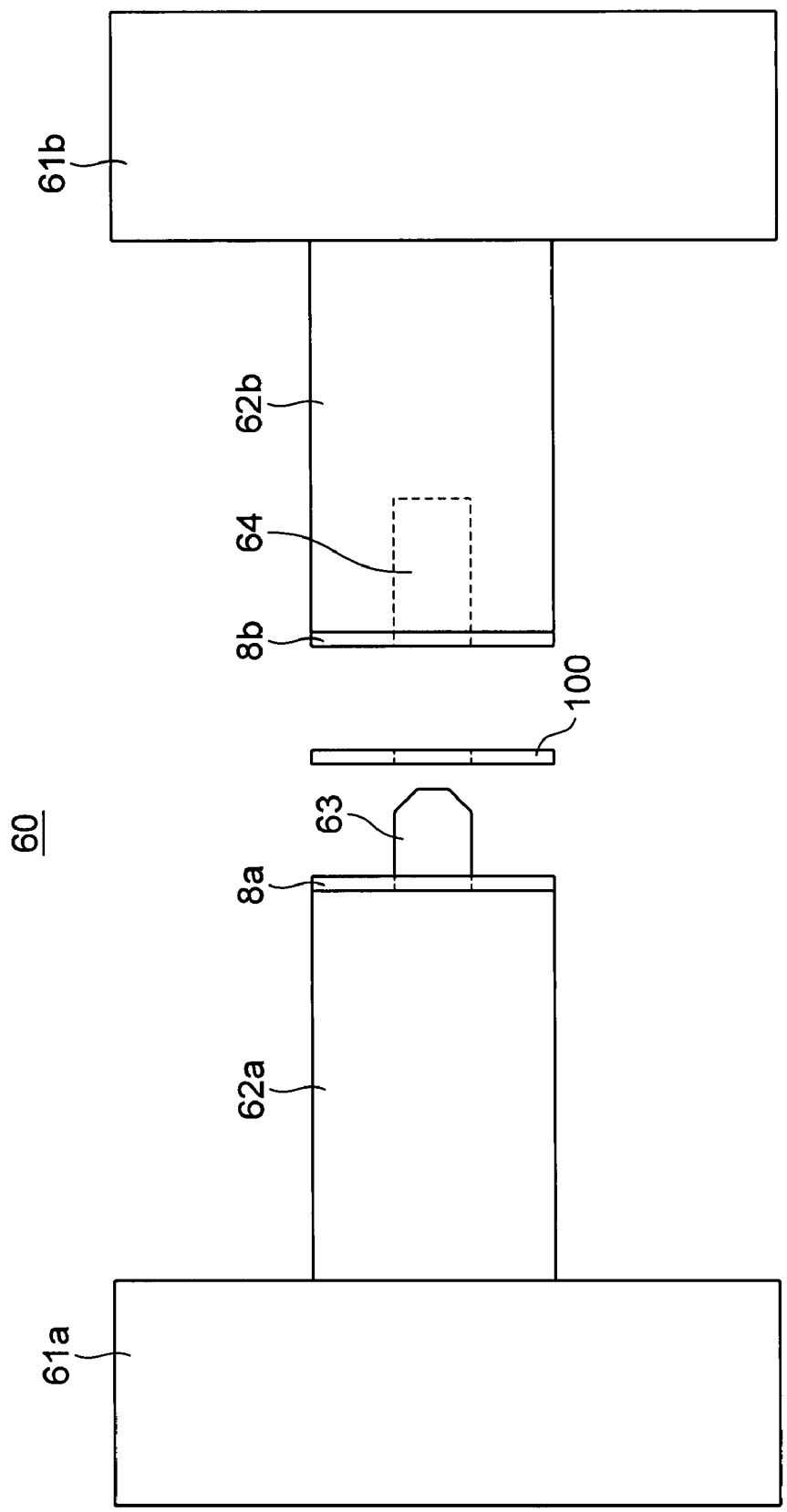
FIG. 5 is a schematic diagram showing the structure of a chamber for nanoimprinting.
Figure 6:
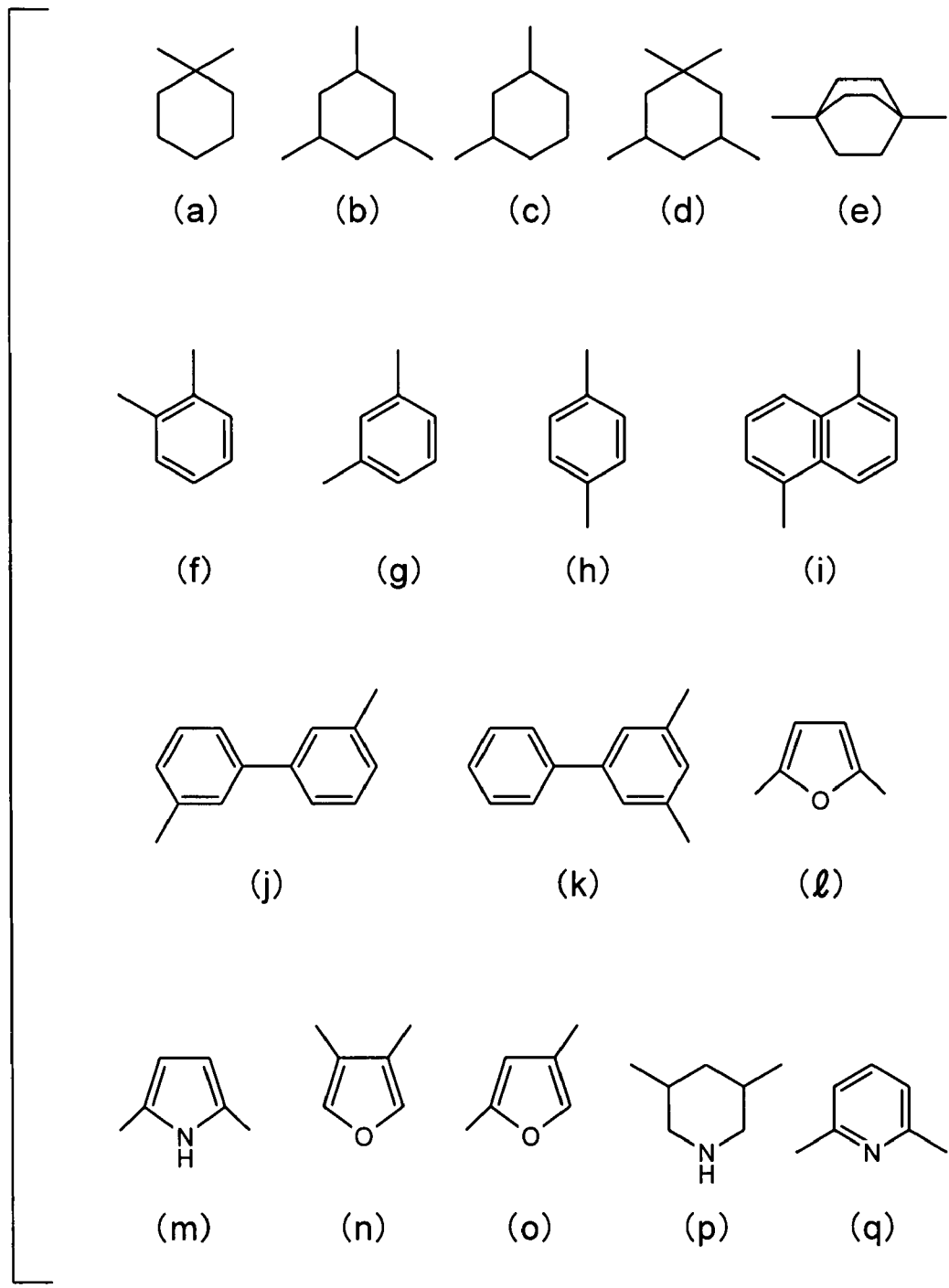
FIGS. 6(a) to 6(q) are diagrams showing specific examples of a compound contained in a material of a pattern transfer film to be used in the manufacturing method according to one embodiment of the present invention.
Figure 7:
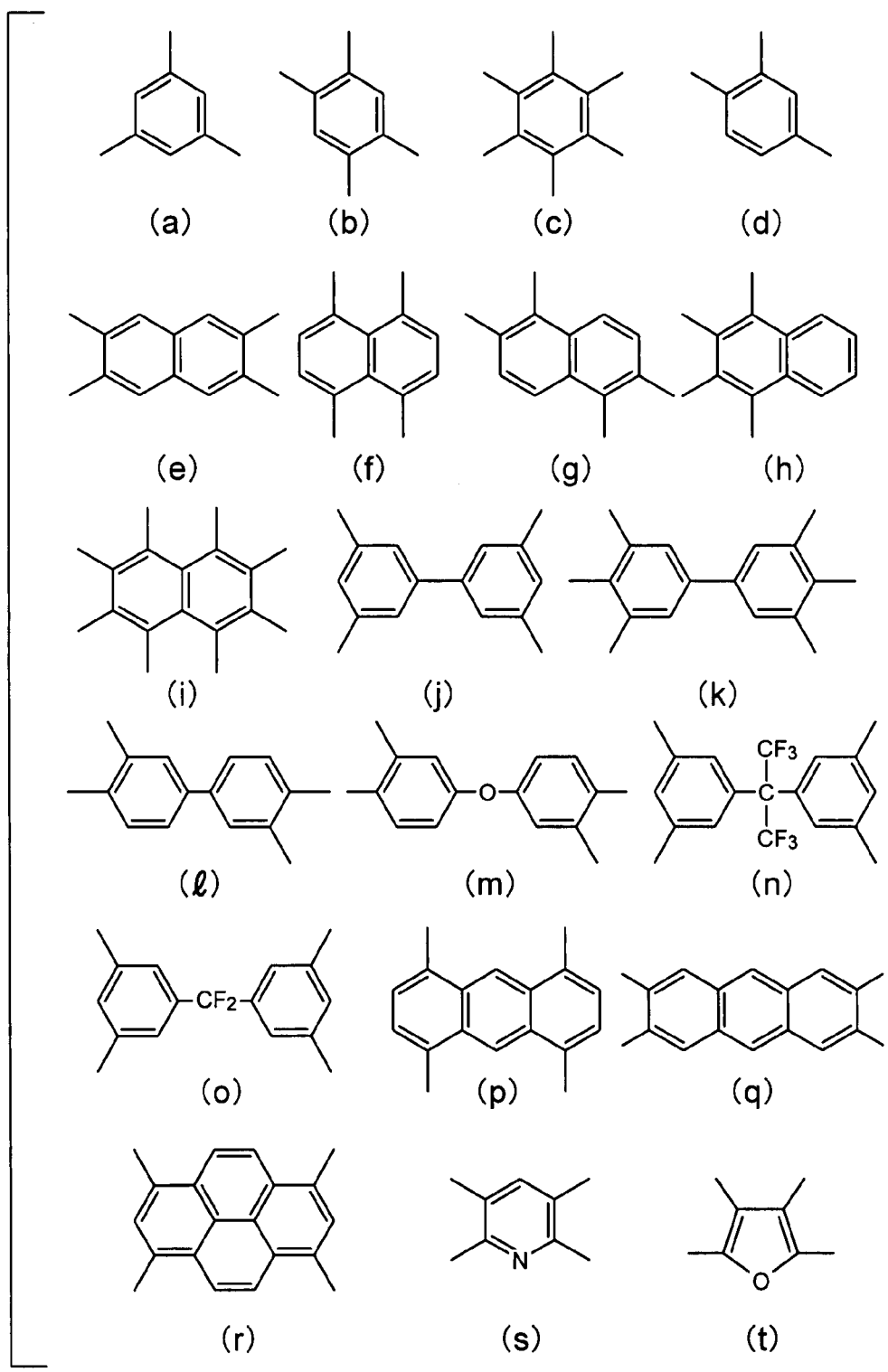
FIGS. 7(a) to 7(t) are diagrams showing specific examples of a compound contained in a material of a pattern transfer film to be used in the manufacturing method according to one embodiment of the present invention.
Figure 8:
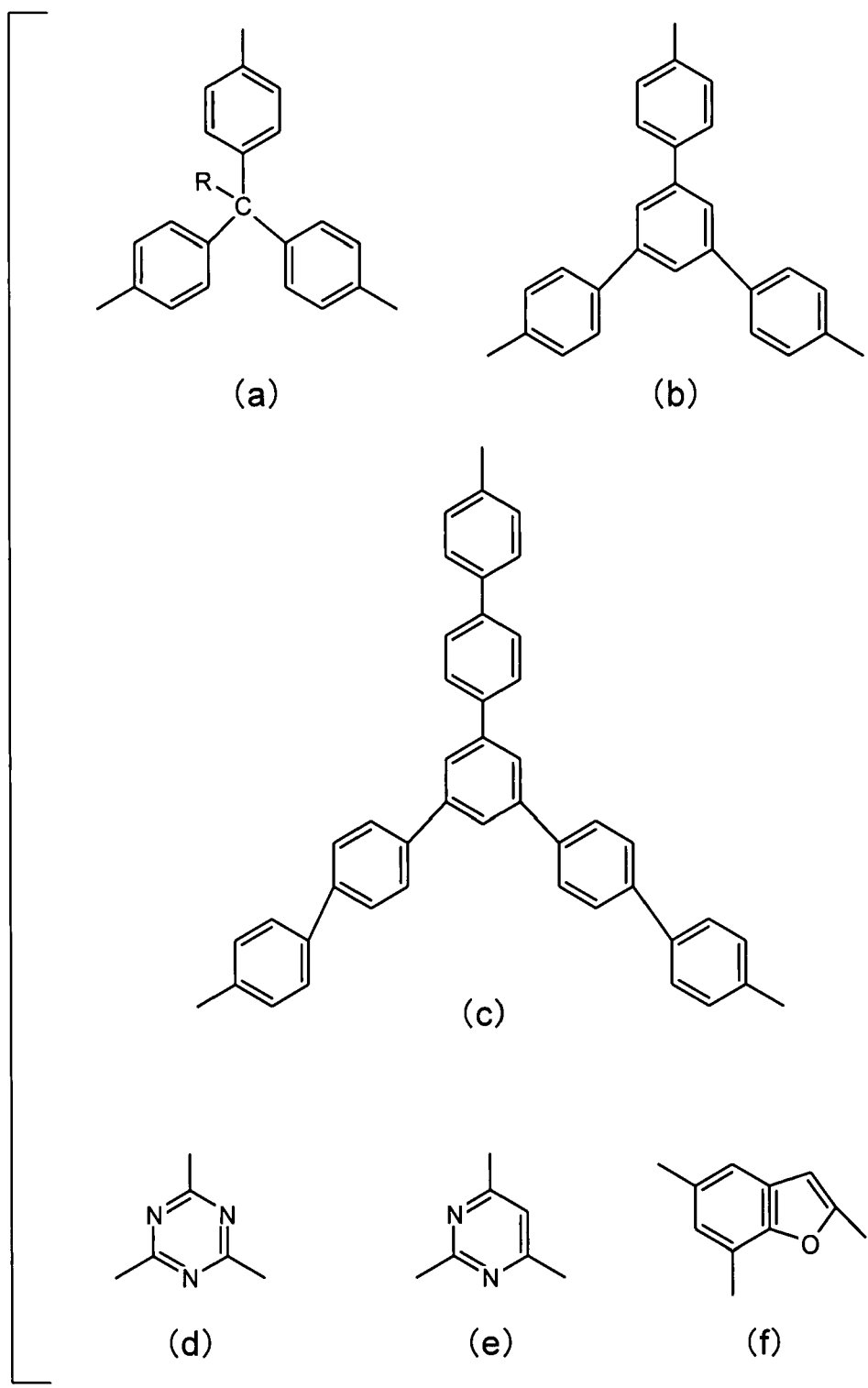
FIGS. 8(a) to 8(f) are diagrams showing specific examples of a compound contained in a material of a pattern transfer film to be used in the manufacturing method according to one embodiment of the present invention.
Figure 9:
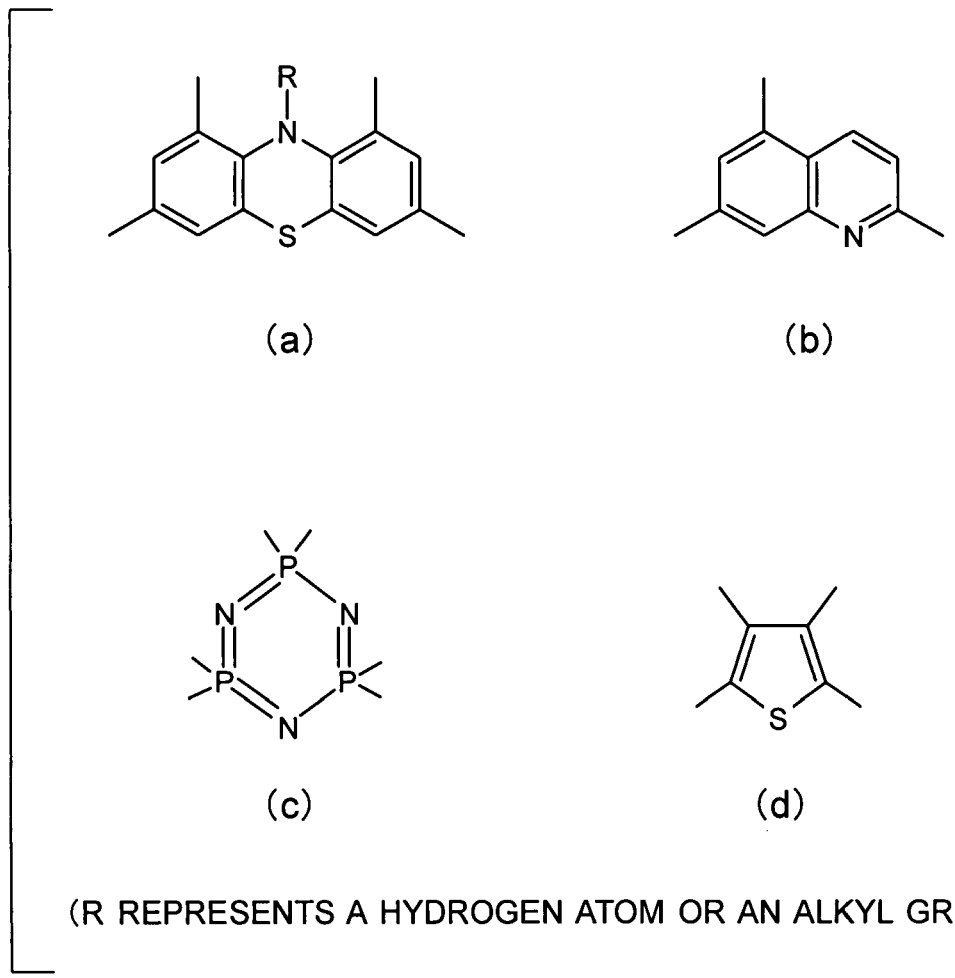
FIGS. 9(a) to 9(d) are diagrams showing specific examples of a compound contained in a material of a pattern transfer film to be used in the manufacturing method according to one embodiment of the present invention.
Figure 10:
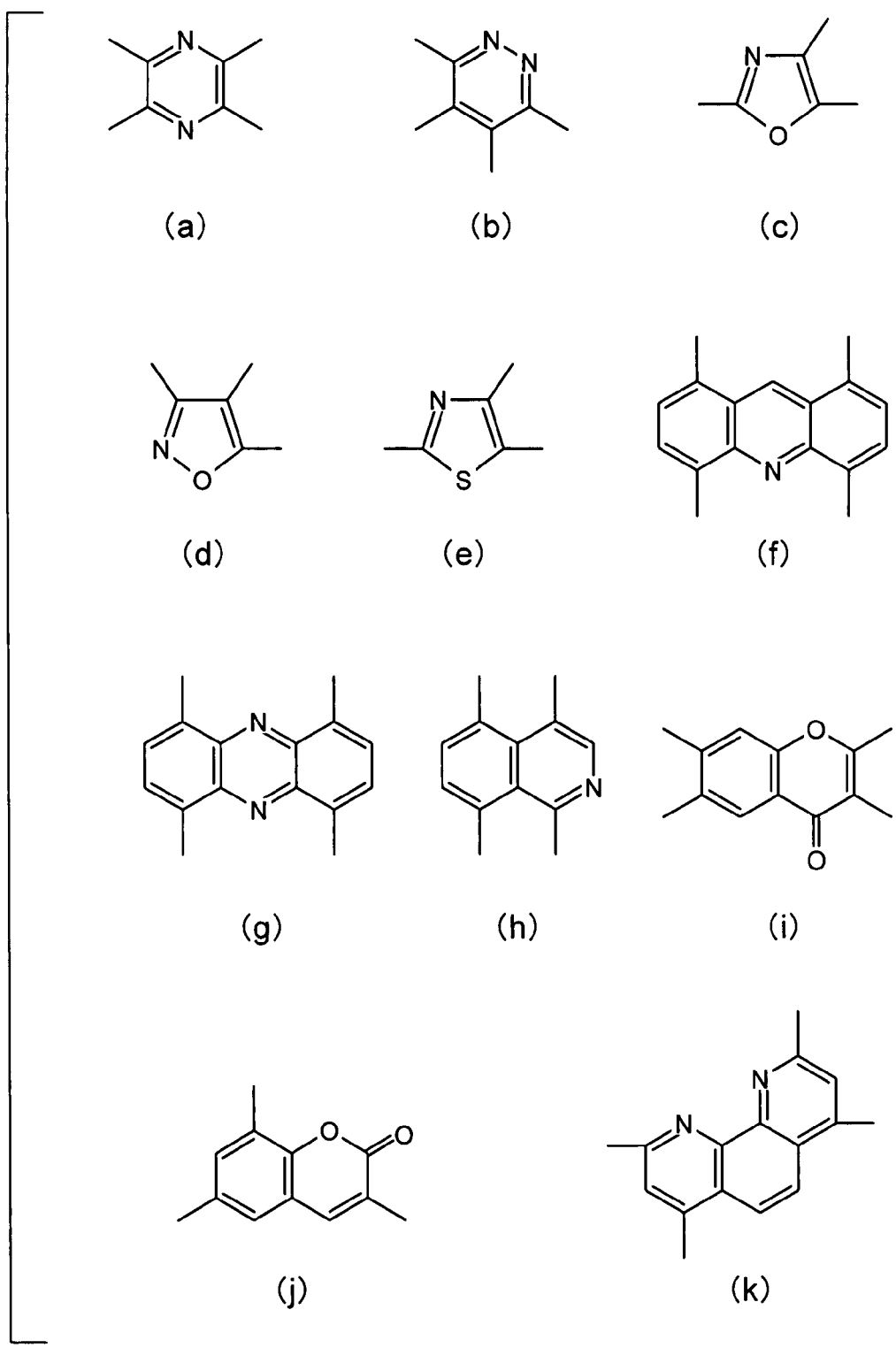
FIGS. 10(a) to 10(k) are diagrams showing specific examples of a compound contained in a material of a pattern transfer film to be used in the manufacturing method according to one embodiment of the present invention.
Figure 11:
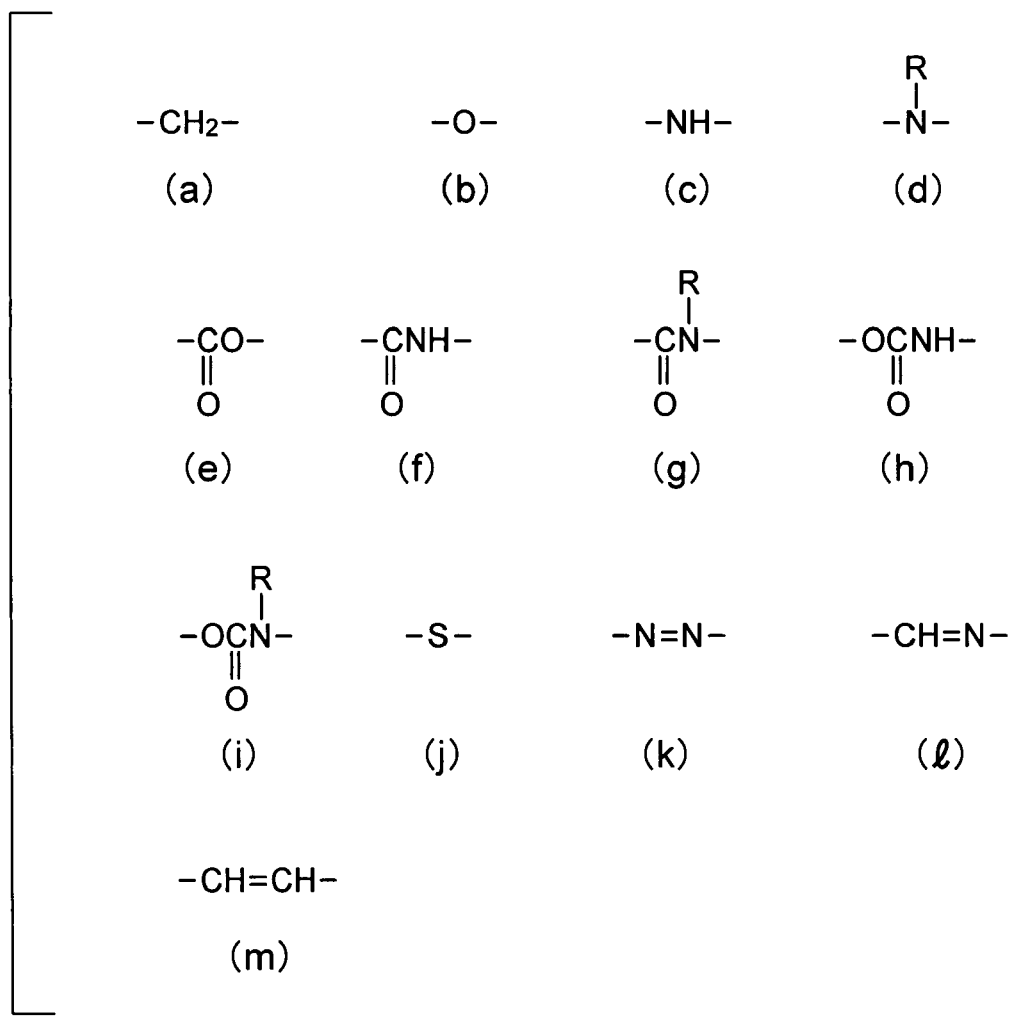
FIGS. 11(a) to 11(m) are diagrams showing specific examples of a compound contained in a material of a pattern transfer film to be used in the manufacturing method according to one embodiment of the present invention.
Figure 12:
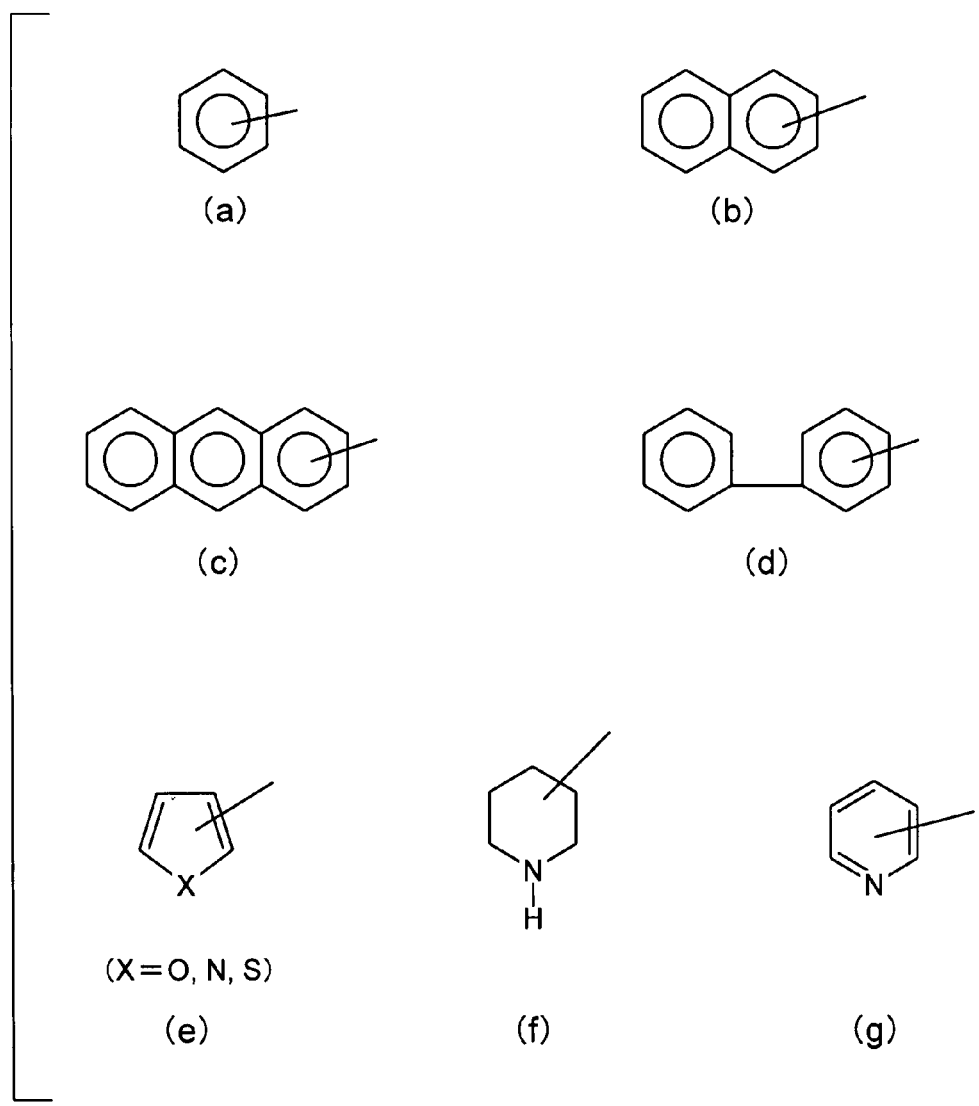
FIGS. 12(a) to 12(g) are diagrams showing specific examples of a compound contained in a material of a pattern transfer film to be used in the manufacturing method according to one embodiment of the present invention.
Figure 13:
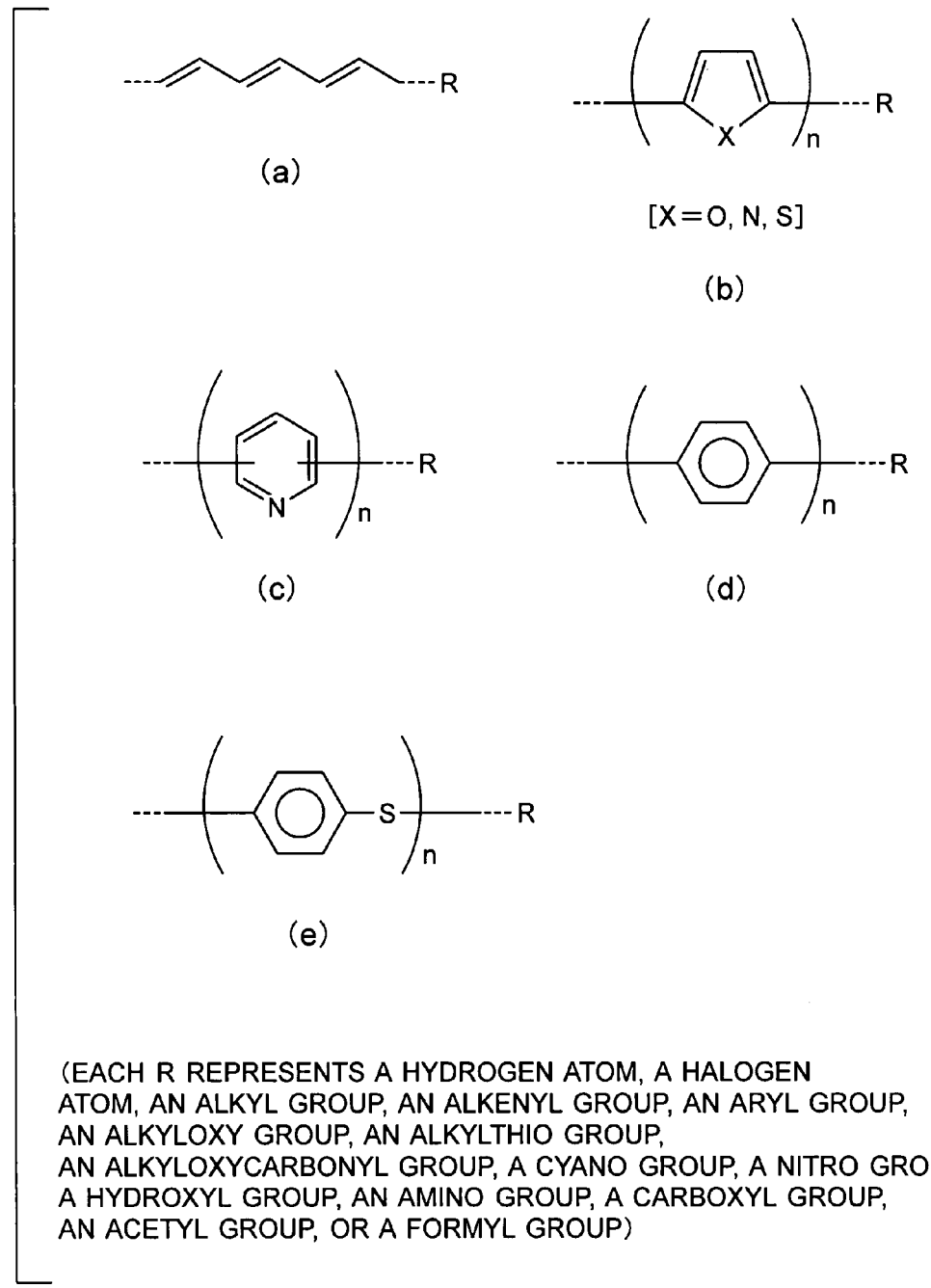
FIGS. 13(a) to 13(e) are diagrams showing specific examples of a compound contained in a material of a pattern transfer film to be used in the manufacturing method according to one embodiment of the present invention.
Figure 14:
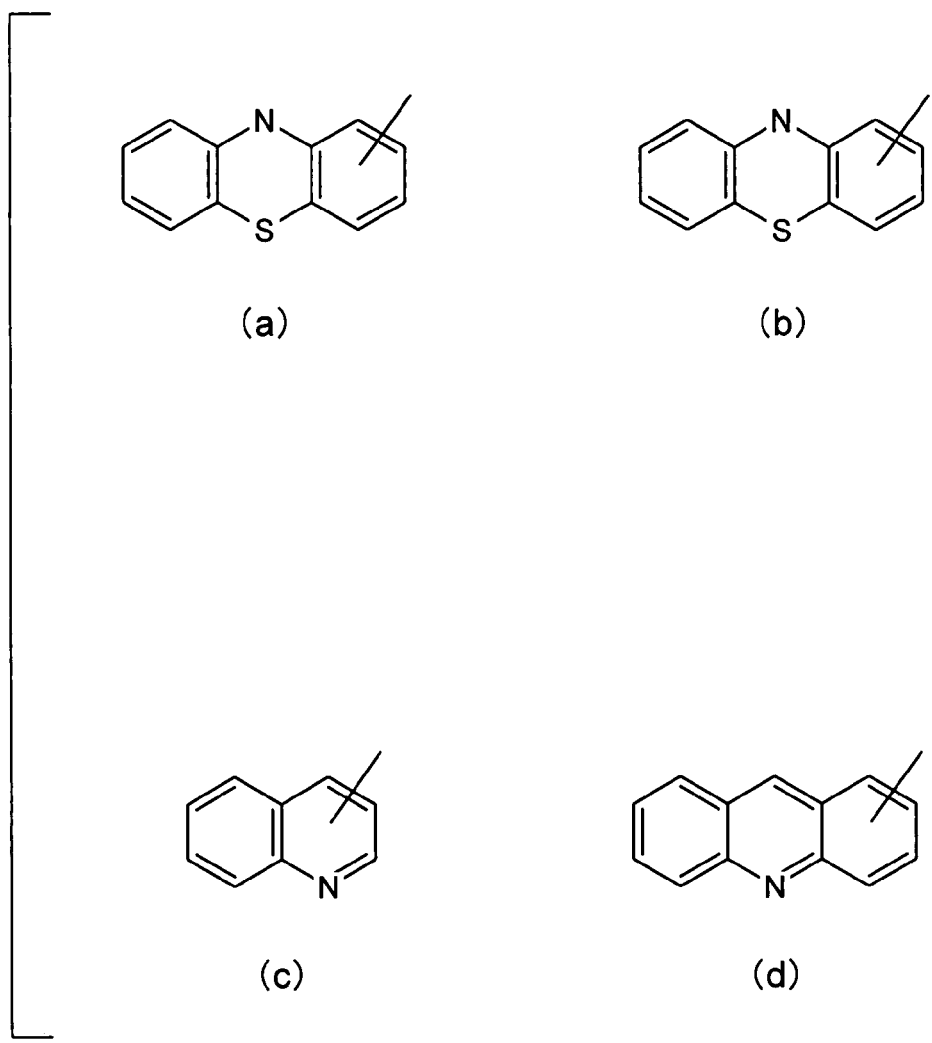
FIGS. 14(a) to 14(d) are diagrams showing specific examples of a compound contained in a material of a pattern transfer film to be used in the manufacturing method according to one embodiment of the present invention.
Figure 15:
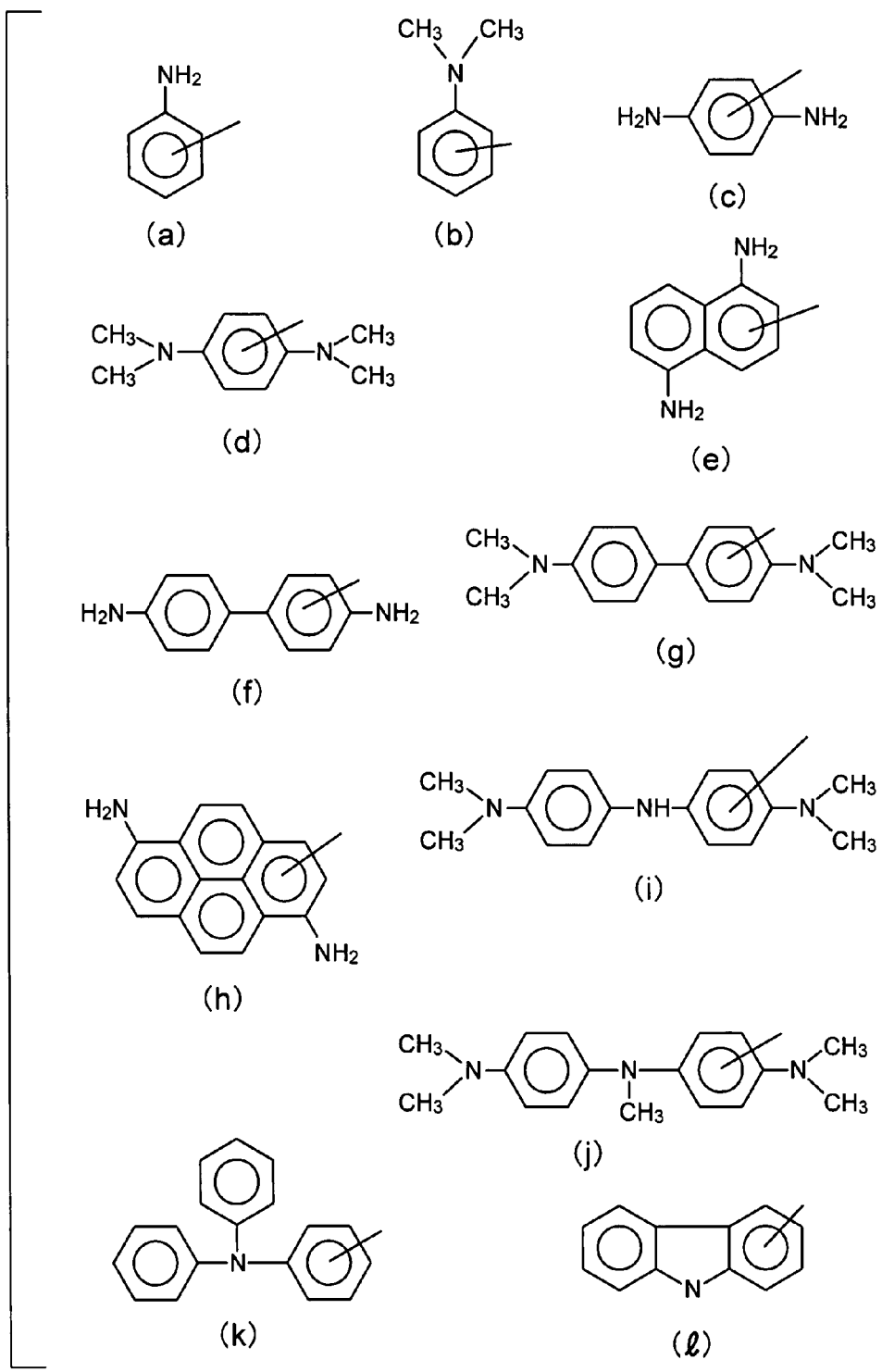
FIGS. 15(a) to 15(l) are diagrams showing specific examples of a compound contained in a material of a pattern transfer film to be used in the manufacturing method according to one embodiment of the present invention.
Figure 16:
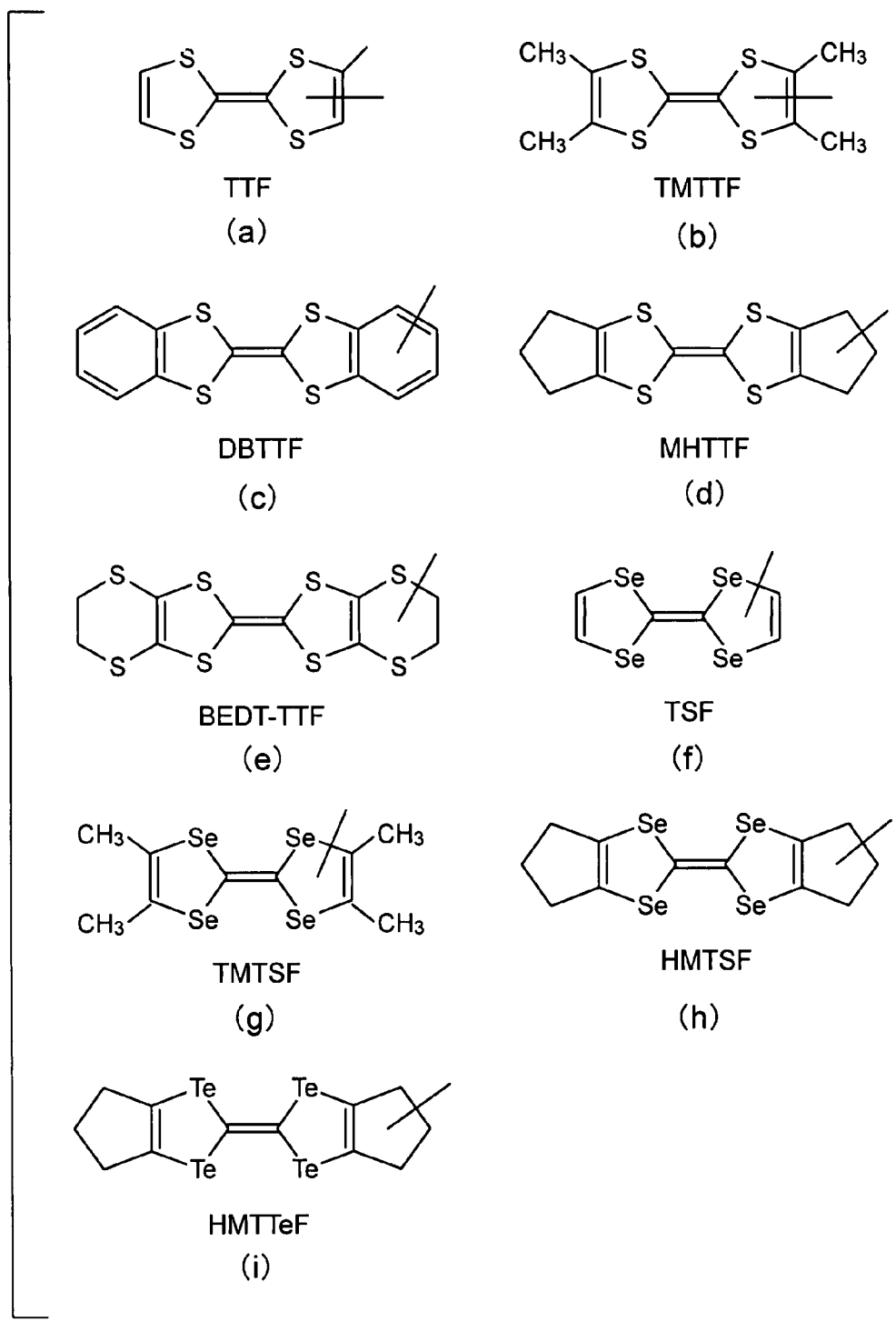
FIGS. 16(a) to 16(i) are diagrams showing specific examples of a compound contained in a material of a pattern transfer film to be used in the manufacturing method according to one embodiment of the present invention.
Figure 17:
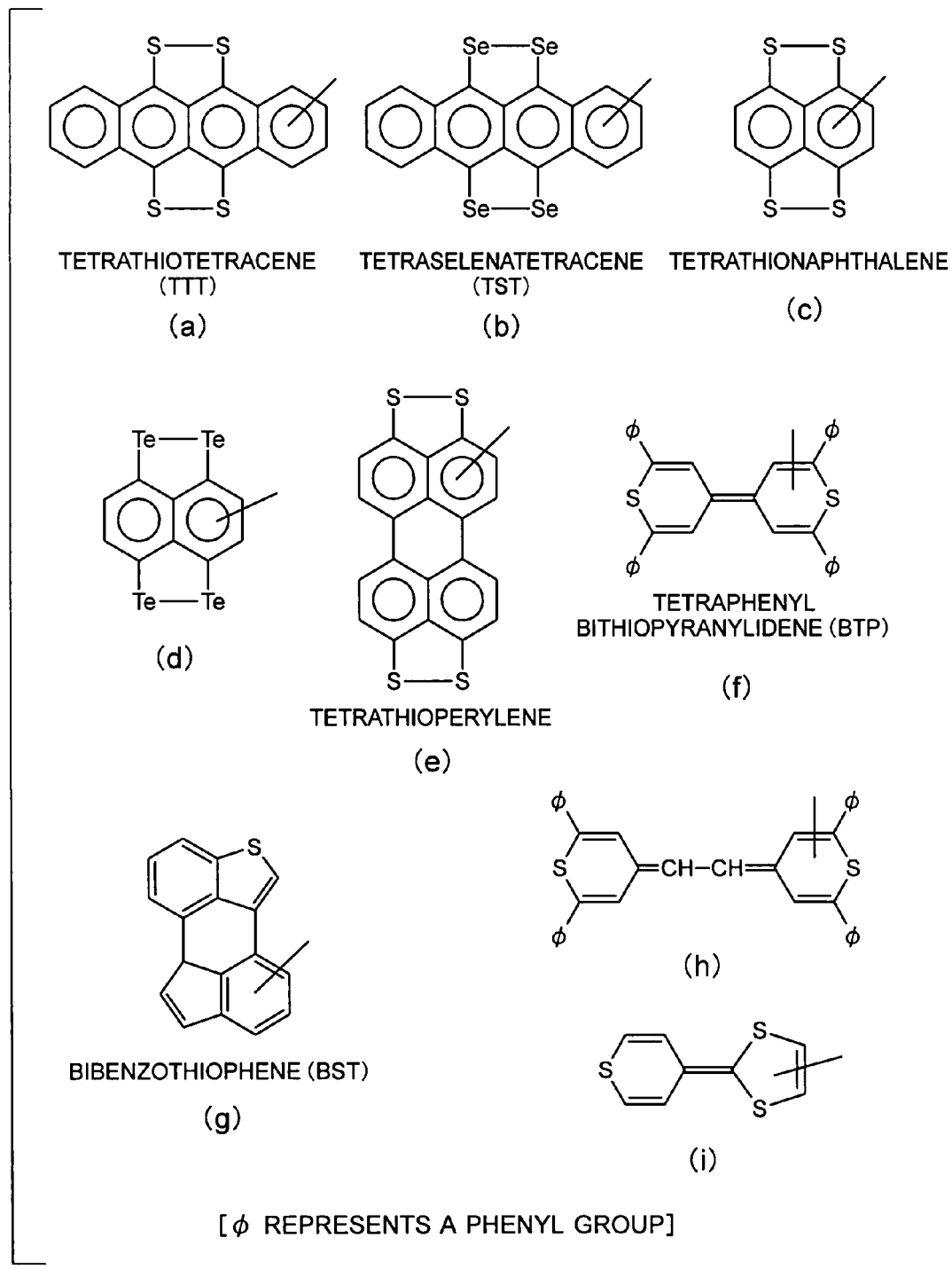
FIGS. 17(a) to 17(i) are diagrams showing specific examples of a compound contained in a material of a pattern transfer film to be used in the manufacturing method according to one embodiment of the present invention.
Figure 18:
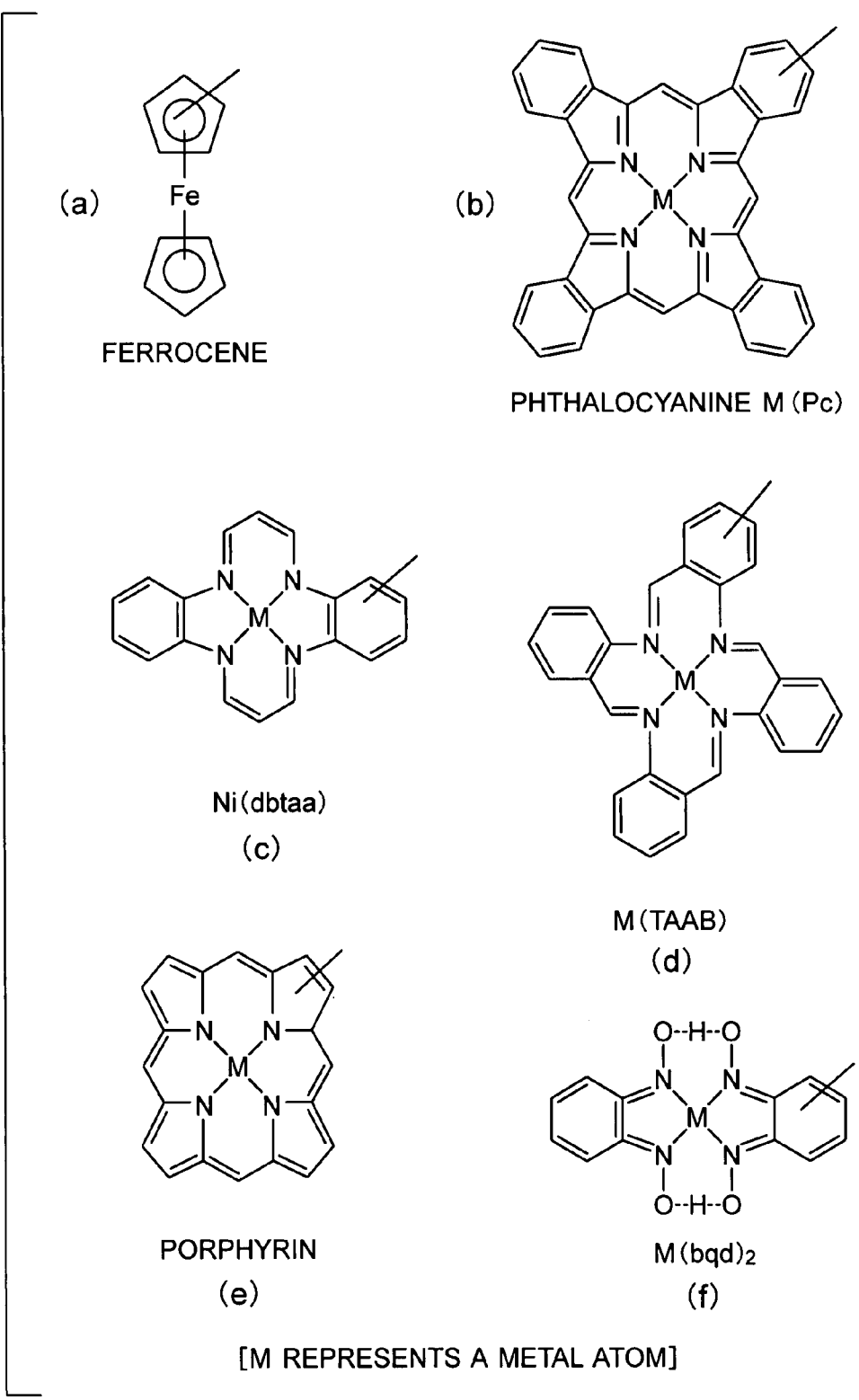
FIGS. 18(a) to 18(f) are diagrams showing specific examples of a compound contained in a material of a pattern transfer film to be used in the manufacturing method according to one embodiment of the present invention.
Figure 19:
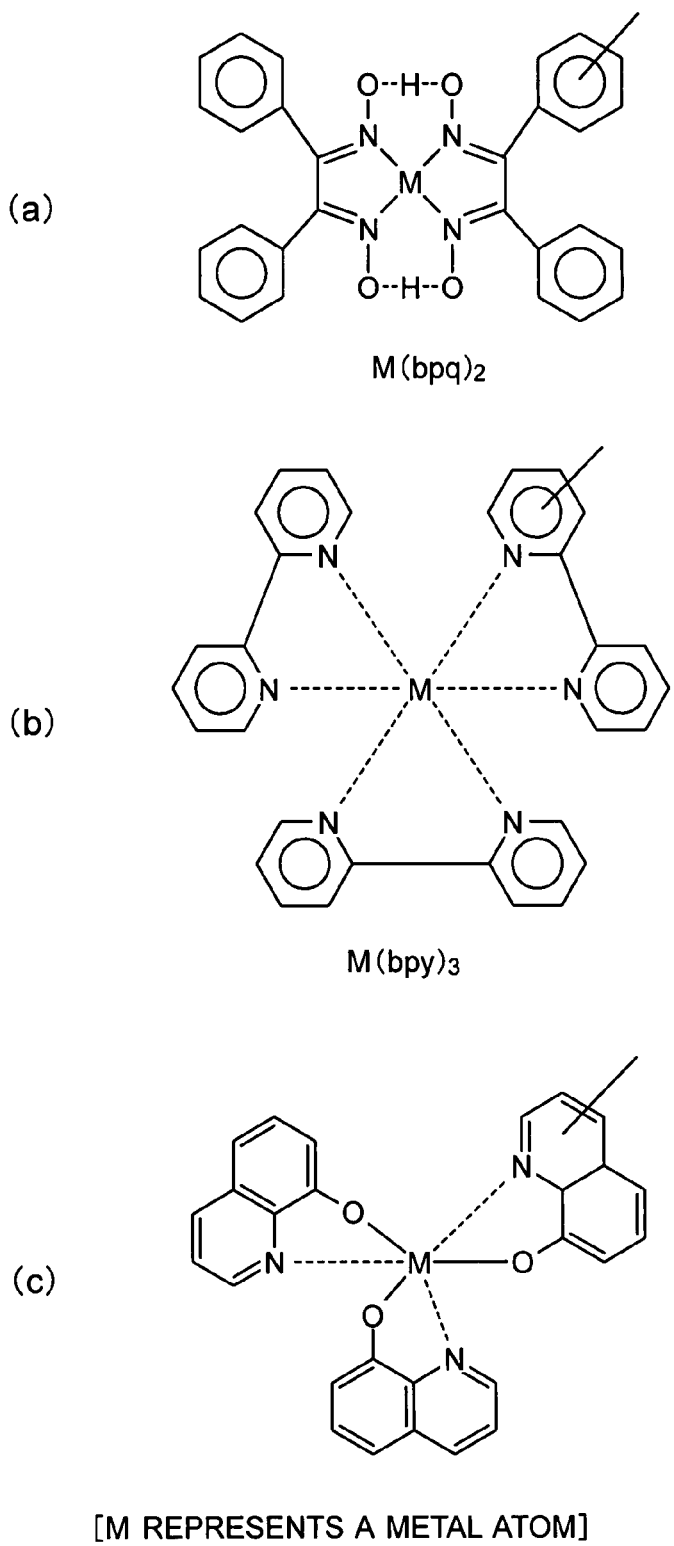
FIGS. 19(a) to 19(c) are diagrams showing specific examples of a compound contained in a material of a pattern transfer film to be used in the manufacturing method according to one embodiment of the present invention.
Figure 20:
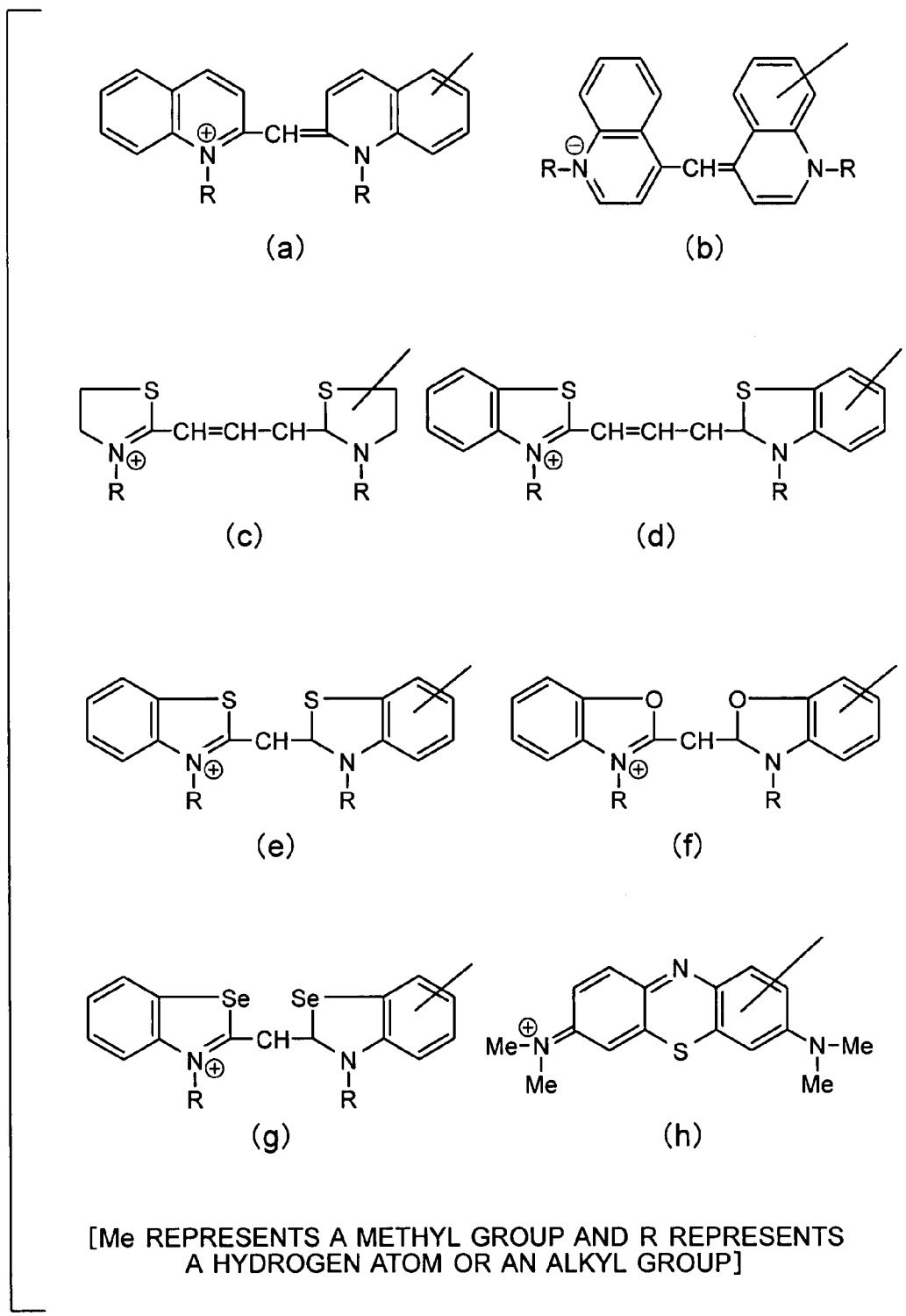
FIGS. 20(a) to 20(h) are diagrams showing specific examples of a compound contained in a material of a pattern transfer film to be used in the manufacturing method according to one embodiment of the present invention.
Figure 21:
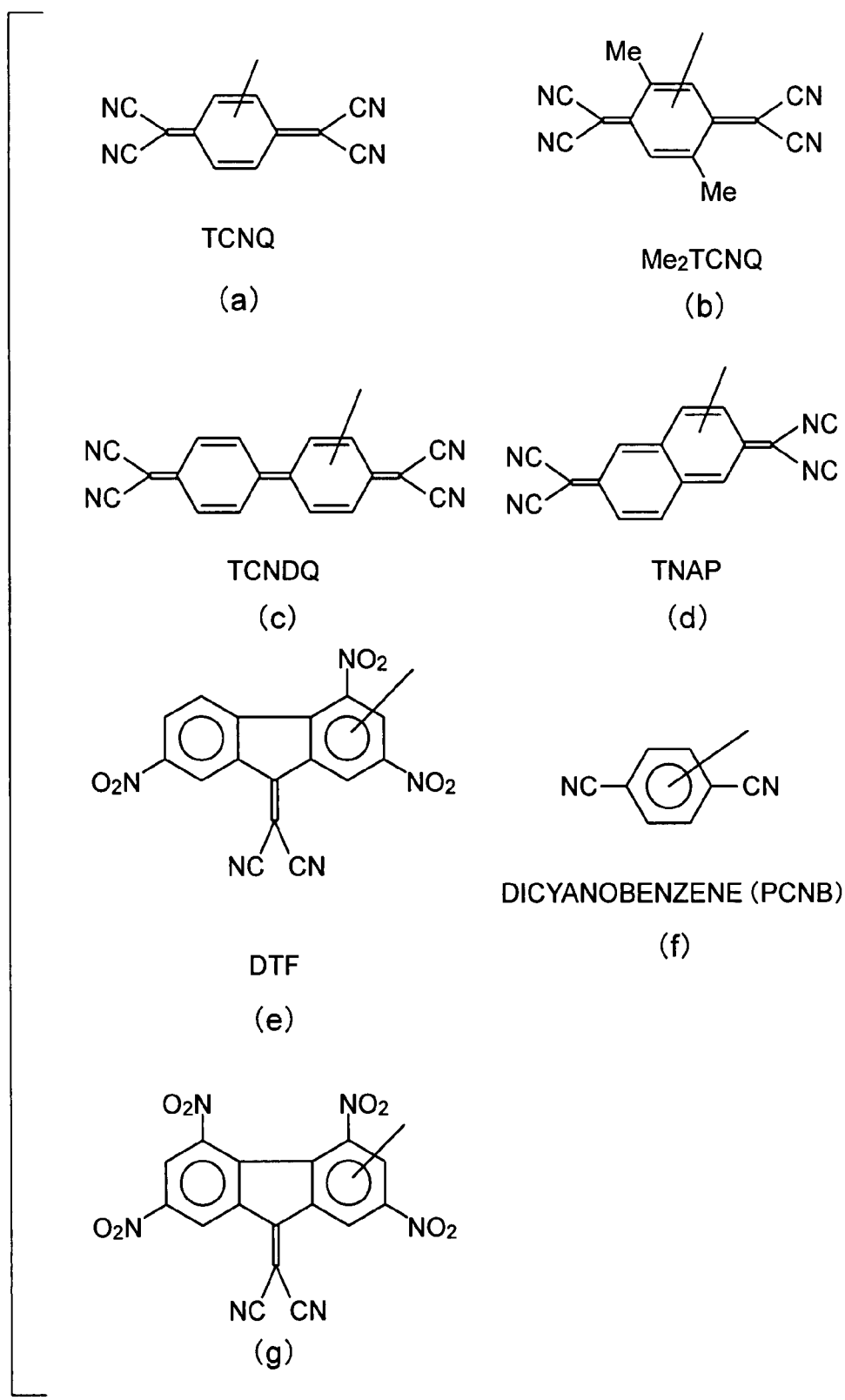
FIGS. 21(a) to 21(g) are diagrams showing specific examples of a compound contained in a material of a pattern transfer film to be used in the manufacturing method according to one embodiment of the present invention.
Figure 22:
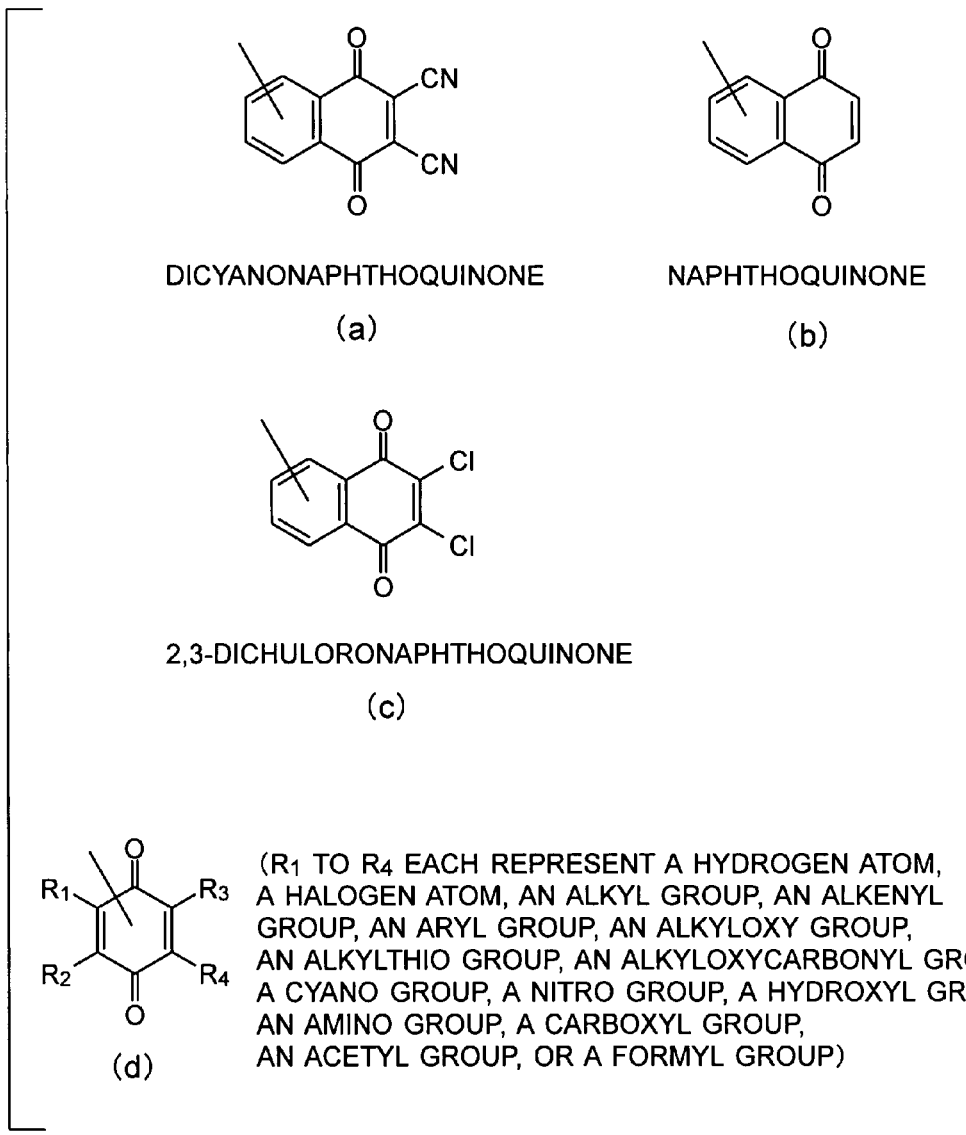
FIGS. 22(a) to 22(d) are diagrams showing specific examples of a compound contained in a material of a pattern transfer film to be used in the manufacturing method according to one embodiment of the present invention.
Figure 23:
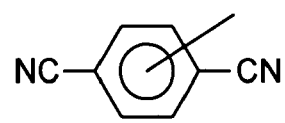
FIGS. 23(a) to 23(e) are diagrams showing specific examples of a compound contained in a material of a pattern transfer film to be used in the manufacturing method according to one embodiment of the present invention.
Figure 23:
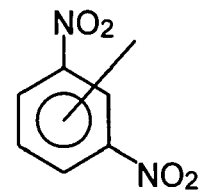
Figure 23:
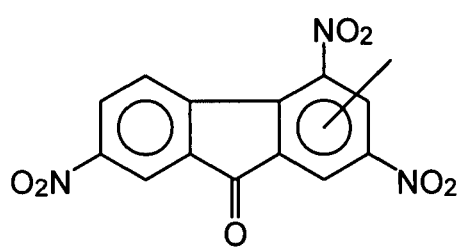
Figure 23:
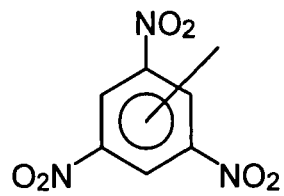
Figure 23:
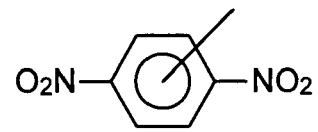
Figure 24:
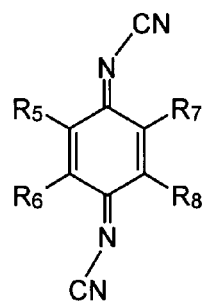
FIGS. 24(a) and 24(b) are diagrams showing specific examples of a compound contained in a material of a pattern transfer film to be used in the manufacturing method according to one embodiment of the present invention.
Figure 24:
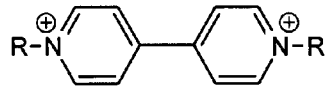
Figure 25:
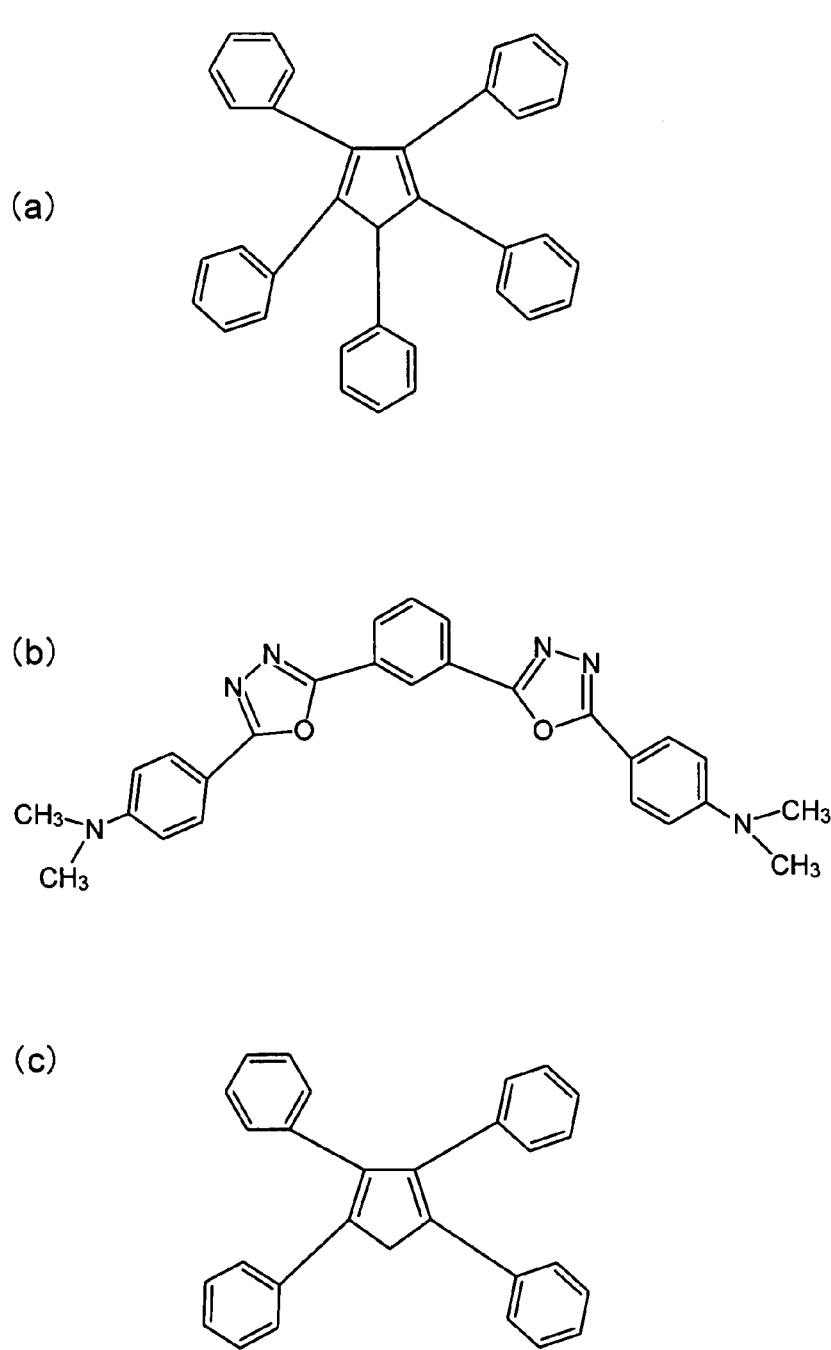
FIGS. 25(a) to 25(c) are diagrams showing specific examples of a compound contained in a material of a pattern transfer film to be used in the manufacturing method according to one embodiment of the present invention.
Figure 26:
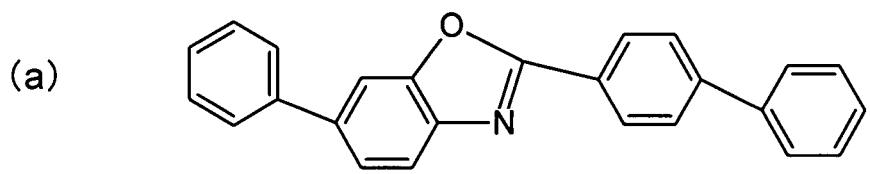
FIGS. 26(a) to 26(d) are diagrams showing specific examples of a compound contained in a material of a pattern transfer film to be used in the manufacturing method according to one embodiment of the present invention.
Figure 26:
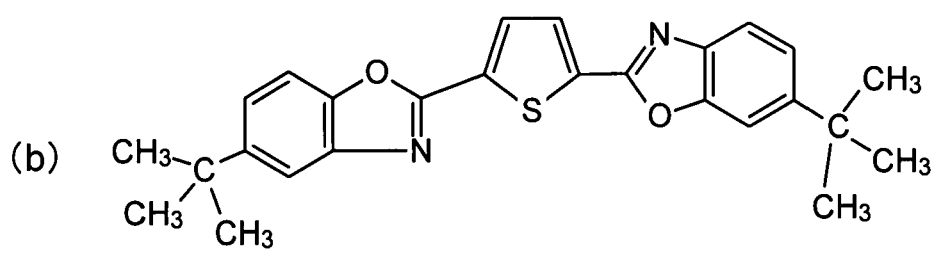
Figure 26:
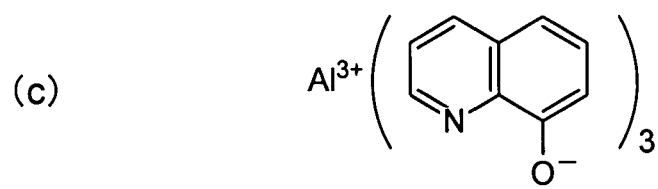
Figure 26:
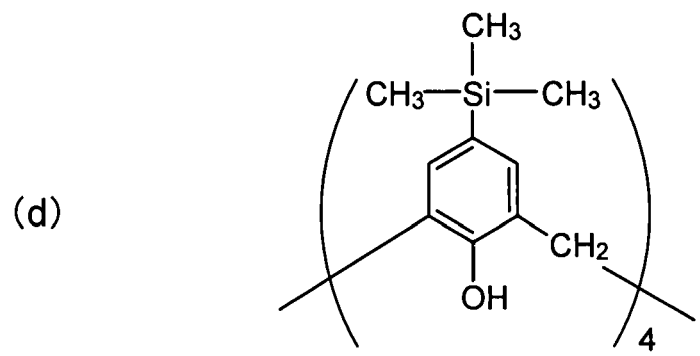
Figure 27:
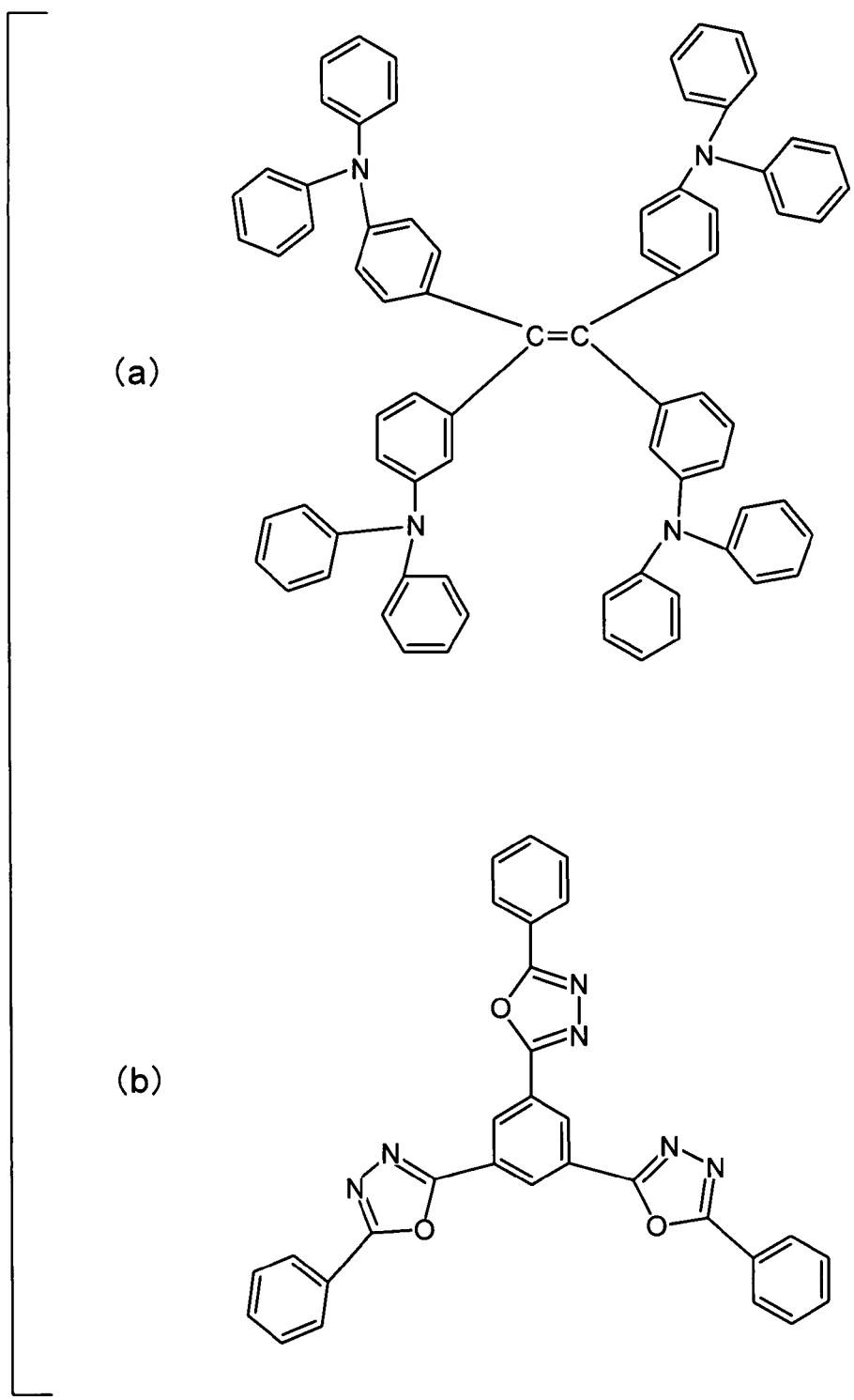
FIGS. 27(a) and 27(b) are diagrams showing specific examples of a compound contained in a material of a pattern transfer film to be used in the manufacturing method according to one embodiment of the present invention.
Figure 28:
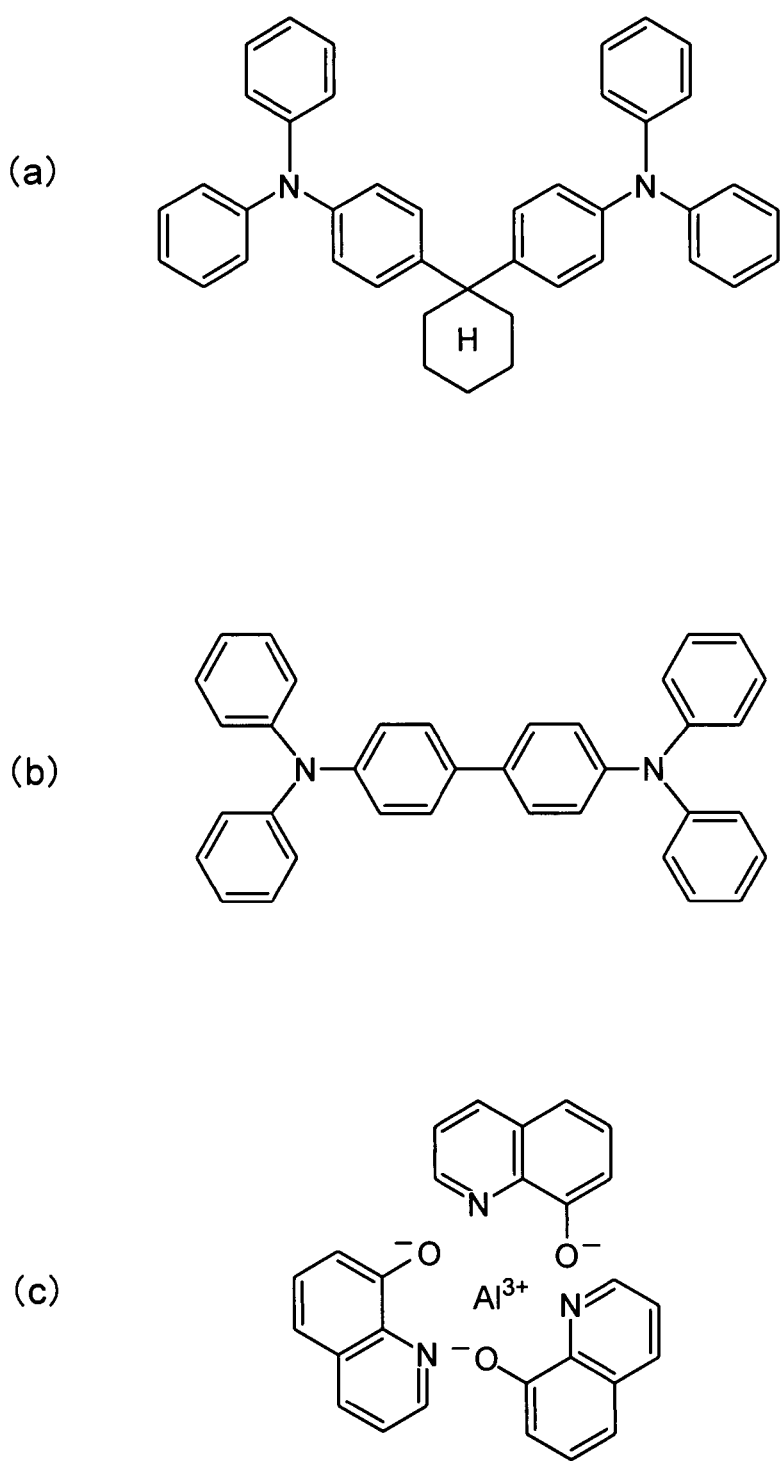
FIGS. 28(a) to 28(c) are diagrams showing specific examples of a compound contained in a material of a pattern transfer film to be used in the manufacturing method according to one embodiment of the present invention.
Figure 29:
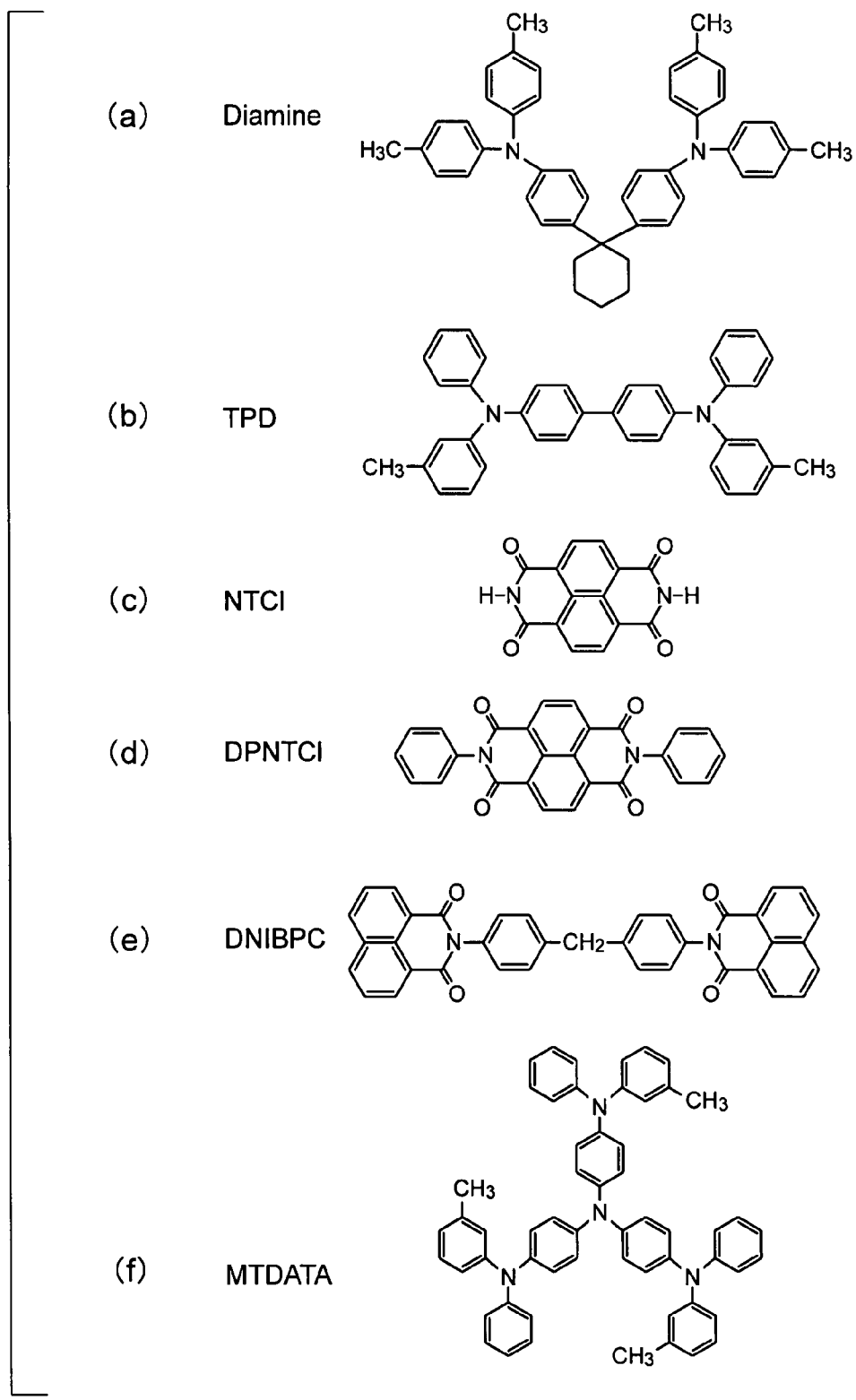
FIGS. 29(a) to 29(f) are diagrams showing specific examples of a compound contained in a material of a pattern transfer film to be used in the manufacturing method according to one embodiment of the present invention.

In conventional HDDs, there arises a problem of interference between adjacent tracks. Particularly, reduction of blurred writing caused by a recording head magnetic fringe effect is an important technical issue. A discrete track recording-type patterned medium can have an increased track density because a side erase phenomenon at the time of recording and a side read phenomenon in which information pieces of adjacent tracks are mixed at the time of reading of data can be reduced. The material of the stamper 8 is not particularly limited as long as the degree of deformation under pressure during imprinting is low. Examples of such a material of the stamper 8 include dielectric materials such as $SiO_2$, Si, and SiN, metals such as Ni and metal alloys, and carbon materials. The surface of the stamper 8 is subjected to treatment of mold-releasing agent to improve releasability between the stamper 8 pressed against the pattern transfer film 6 and the pattern transfer film 6. The treatment of mold-releasing agent e.g $SiO_2$ etc. is carried out using a silane coupling agent having a reactive group such as trichlorosilane, methoxysilane, or ethoxysilane at the end of an alkyl chain or a fluorocarbon chain. Examples of such a silane coupling agent include octadecyltrichlorosilane, octadecyltrimethoxysilane (ODT), and hexamethyldisilazane (HMDS). The surface of the stamper can be easily subjected to release treatment by immersing the stamper in an ethanol solution of ODT or HMDS for about 1 hour and then cleaning the stamper with a solvent such as ethanol. The center of the pattern formed in the surface of the stamper 8 subjected to release treatment is aligned to within 100 μm of the center of the disk, and then the stamper 8 is pressed against the disk to transfer the pattern into the pattern transfer film 6. FIG. 5 is a schematic diagram showing the inner structure of an imprinting apparatus 60 provided in the imprinting chamber 25. In the imprinting apparatus 60, a pair of horizontal hydraulic presses 61a and 61b are provided on opposite sides of a disk 100. The hydraulic presses 61a and 61b have a press table 62a and a press table 62b, respectively. On the press surface of the press table 62a of the hydraulic press 61a, there is provided a projection 63 to ensure center-to-center alignment between the disk 100 and the stampers 8a and 8b. On the other hand, in the press table 62b of the hydraulic press 61b, there is provided a recess 64 into which the projection 63 is to be inserted. Both of the presses 61a and 61b start to apply pressure onto the disk 100 simultaneously to transfer a pattern into a pattern transfer film formed on each of both surfaces of the disk 100. Each of both the press surfaces may have a mechanism for heating and cooling the stamper. By heating the surface of each of the stampers 8a and 8b at the time of imprinting, it is possible to carry out pattern transfer at a lower pressure. In this case, the stampers 8a and 8b are separated from the disk 100 after the stampers are cooled.

Usually, as shown in FIG. 1C, there is left a certain thickness of residue 6b of the pattern transfer film 6 at the bottom of each recess of the etching mask pattern 6a formed by imprinting. In order to improve the form accuracy of magnetic material processing, it is necessary to remove the residue 6b. The residue 6b is removed by transporting the substrate 2 having the etching mask pattern 6a formed thereon into the dry etching chamber 27 to carry out dry etching using oxygen. In a case where the pattern transfer film 6 is formed of a low-molecular-weight organic material, it is possible to remove the residue 6b by carrying out dry etching using oxygen (see FIG. 1D).

Next, the substrate (disk) 2 having the etching mask pattern 6a formed in such a manner as described above is transported into the dry etching chamber 29. In this dry etching chamber 29, as shown in FIG. 2A, the magnetic recording film 4 is subjected to etching using the pattern 6a as a mask. The magnetic recording film 4 is etched by ion beam etching or reactive ion etching. Examples of an etching gas to be used include argon gas, chlorine gas, a mixture of chlorine gas and argon gas, $BCl_3$ gas, a mixture of $BCl_3$ gas and argon or $Cl_2$ gas, and a mixture of CO gas and $NH_3$ gas. It is to be noted that etching is carried out by irradiating the disk with an ion beam of an etching gas emitted from an ion gun provided on each of both sides of the disk. Alternatively, a RIE apparatus which can apply an RF (radio frequency) voltage to the disk may be used. In a case where etching is carried out using an ion gun, an ion incident angle between the ion beam and the disk surface may be oblique. At this time, a mechanism for rotating the disk is preferably provided to uniformly etch the entire surface of the disk. It is to be noted that a magnetic material is attached to the side walls of the etching mask pattern 6a by the etching.

Next, the substrate (disk) 2 having the magnetic recording film 4 subjected to etching is transported into the ion beam irradiation chamber 31 to remove the magnetic material attached to the side walls of the etching mask 6a. The magnetic material is removed using a low-angle ion beam apparatus. The ion beam apparatus is provided for each of both surfaces of the disk. The disk is rotated and irradiated with an ion beam, and as a result, as shown in FIG. 2A, the magnetic material attached to the side walls of the etching mask 6a is removed. It is to be noted that the magnetic material attached to the side walls of the etching mask 6a may be removed after the etching mask 6a is removed from the substrate 2. In this case, the magnetic material is removed by irradiating the disk with an ion beam at an oblique low angle. Alternatively, removal of the etching mask and removal of the magnetic material attached to the side walls of the etching mask may be alternately repeated.

Next, the substrate (disk) 2 having the etching mask 6a from which the magnetic material has been removed is transported into the lamp annealing chamber 33 to remove the etching mask 6a from the substrate 2. As shown in FIG. 2B, the etching mask 6a is removed by heating the disk to 100 to 400° C. In this embodiment, the disk is heated by lamp annealing. Lamp annealing allows a quick temperature rise of a sample in a vacuum, which is effective for achieving improved disk processing speed. It is to be noted that a heating lamp may be provided on each of both sides of the disk to remove the etching mask 6a formed on each of both surfaces of the disk simultaneously. By sufficiently heating the disk, it is possible to almost completely remove the etching mask 6a. However, there is a case where the etching mask 6a is not completely removed because the etching mask 6a adsorbed to the surface of the magnetic recording film 4a is left as a thin film. In this case, after the etching mask 6a is subjected to lamp annealing, the remaining thin film of the etching mask 6a adsorbed to the surface of the magnetic recording film 4a is removed by light dry etching such as argon gas plasma etching.

Next, the substrate (disk) 2 from which the etching mask 6a has been removed is transported into the film formation chamber 35. As shown in FIG. 2C, a non-magnetic film 10 is formed so as to cover the etched magnetic recording film 4a. At this time, the recesses of the magnetic recording film 4a formed by etching are filled with the non-magnetic film. The non-magnetic film 10 can be formed using a metallic, dielectric or carbon material by sputtering or plasma chemical vapor deposition (CVD).

Next, the disk having the non-magnetic film 10 formed thereon is transported into the dry etching chamber 37. As shown in FIG. 2D, the non-magnetic film 10 is etched back by dry etching until the upper surface of the magnetic recording film 4a is exposed.

Next, the disk is transported into the film formation chamber 39. As shown in FIG. 2E, a protection layer 12 is formed using diamond like carbon by CVD.

It is to be noted that in this embodiment, as described above, the protection layer 12 is formed after the non-magnetic film 10 is formed and etched back, but the formation of the non-magnetic film 10 may be omitted. In this case, the protection layer 12 is formed so as to directly cover the magnetic recording film 4a.

All the steps described above are carried out in a vacuum environment of, for example, $1 \times 10^{-3}$ Torr or less. Therefore, it is possible to maintain a vacuum environment (for example, $1 \times 10^{-3}$ Torr or less) also when the disk is transported from one processing chamber to another processing chamber, thereby improving the throughput of magnetic recording media production It is to be noted that the above-described steps may be carried out for both surfaces of the disk.

The thus manufactured disk having the protection layer 12 formed thereon is coated with a lubricant. Examples of the lubricant include perfluoropolyether, fluorinated alcohols, and fluorinated carboxylic acids.

Next, a material for forming the pattern transfer film 6 according to the present embodiment will be described.

The pattern transfer film 6 according to the present embodiment is formed using a low-molecular-weight organic material represented by the general formula $Z-(X-Y)_n$, where Z represents an aromatic skeleton or an alicyclic skeleton, Y represents an aromatic skeleton or a molecular skeleton containing a metal atom such as Si, X represents a divalent coupling group, and n is an integer of 1 or more.

Specific examples of Z are shown in FIGS. 6(a) to 6(q), FIGS. 7(a) to 7(t), FIGS. 8(a) to 8(f), FIGS. 9(a) to 9(d), and FIGS. 10(a) to 10(k). It is to be noted that R in FIGS. 9(a) to 9(d) represents a hydrogen atom or an alkyl group.

Specific examples of X are shown in FIGS. 11(a) to 11(m).

Specific examples of Y are shown in FIGS. 12(a) to 12(g), FIGS. 13(a) to 13(e), FIGS. 14(a) to 14(d), FIGS. 15(a) to 15(l), FIGS. 16(a) to 16(i), FIGS. 17(a) to 17(i), FIGS. 18(a) to 18(f), FIGS. 19(a) to 19(c), FIGS. 20(a) to 20(h), FIGS. 21(a) to 21(g), FIGS. 22(a) to 22(d), FIGS. 23(a) to 23(e), and FIGS. 24(a) to 24(b). It is to be noted that Y contains any one of the aromatic skeletons, alicyclic skeleton, and molecular skeleton containing H, $CH_3$, Si, or Sn shown in FIGS. 12(a) to 24(b).

Specific examples of a low-molecular-weight organic material which can form a film having particularly excellent flatness are shown in FIGS. 25(a) to 25(c), FIGS. 26(a) to 26(d), FIGS. 27(a) to 27(b), FIGS. 28(a) to 28(c), and FIGS. 29(a) to 29(f).

Example

Hereinbelow, an example of the present invention will be described.

In this example, a perpendicular magnetic recording film having a two-layer structure comprising a soft magnetic foundation layer and a perpendicular magnetic recording layer was formed as a magnetic recording film 4 by sputtering on a 2.5-inch glass disk. More specifically, a CoZrNb-based alloy film having a thickness of 200 nm was formed as a soft magnetic foundation layer, a Ru film having a thickness of 5 nm was formed as an intermediate layer, and a CoCrPt-based alloy film having a thickness of 15 nm was formed as a recording layer. As a pattern transfer layer 6, a TPD film having a thickness of 40 nm was formed. A base vacuum level was $2 \times 10^{-6}$ Torr, the temperature of a crucible at the time of film formation was 200° C., and the rate of film formation was 10 nm/min.

Nanoimprinting was carried out at a pressing pressure of 40 t. A master of a stamper 8 was prepared by writing a pattern of a patterned medium by electron-beam lithography on a resist film formed on an Si substrate and then transferring the pattern into the Si substrate by dry etching using $CF_4$ gas. The master pattern was subjected to Ni electroforming to obtain an Ni stamper. The thus obtained Ni stamper was used as a stamper 8. The stamper 8 was subjected to release treatment by immersing the Ni stamper in ethanol, in which a fluorocarbon-based silane coupling agent was dissolved at a concentration of 4%, for 1 hour.

The bottom of each recess of a pattern 6a was exposed by carrying out oxygen ion beam etching using an ECR ion source in such a manner that an etching depth was 16 nm in data tracks.

The magnetic recording film 4 was etched by argon ion beam etching in such a manner that an etching depth was 16 nm in data tracks. A residue 6b of the etching mask 6a was removed by heating the disk for 30 sec by lamp annealing using a lamp having an output of 500 W.

Filling of the recesses of the magnetic recording film 4 with a non-magnetic material was carried out by forming an $SiO_2$ film having a thickness of 50 nm. The $SiO_2$ film was etched back by Ar ion beam etching until the surface of the CoCrPt recording film was exposed. Then, a diamond like carbon film having a thickness of 3 nm was formed as a protection layer 12. It is to be noted that in this example, these production steps described above were carried out in chambers using production apparatuses connected to each other, and each chamber is separated from the other chambers by gate valves. The time lapsed from the beginning of production to the completion of formation of the protection layer 12 was 20 min per disk.

After the formation of the protection layer 12, a lubricant film having a thickness of 2 nm was formed using a perfluoropolyether-based lubricant (Z-dol). The smoothness of the thus obtained magnetic recording medium was examined by a flying test using a flying head having an acoustic effect device. The output of the acoustic effect device was determined by flying a flying head whose flying height was 12 nm over the disk rotated at 4,000 rpm, and was, as a result, at the same level as in a case where the flying head was flown over a currently-used magnetic recording medium which was not a patterned medium.

As has been described above, according to the embodiment of the present invention, it is possible to carry out all the manufacturing steps in a vacuum environment and to easily and reliably remove the residue of the etching mask after the etching of the magnetic recording medium, thereby enabling low-cost production of a patterned medium which has an improved S/N ratio and which is capable of high-density recording.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. A method for manufacturing a magnetic recording medium, comprising:

forming a magnetic recording film above a substrate;

forming a pattern transfer film, into which a concavo-convex pattern of a magnetic recording medium is to be transferred by imprinting, by vapor-depositing an organic material for forming the pattern transfer film onto the magnetic recording film while heating the organic material at a temperature of 100° C. to 400° C. in a vacuum of $1 \times 10^{-3}$ Torr or less;

forming an etching mask pattern by transferring the concavo-convex pattern into the pattern transfer film using an imprint stamper;

etching the magnetic recording film using the etching mask pattern as a mask; and removing the etching pattern mask by heating the etching mask pattern at a temperature of 100° C. to 400° C. in a vacuum, wherein formation of the magnetic recording film, formation of the etching mask pattern, etching of the magnetic recording film, and removal of the etching mask pattern are carried out in a vacuum of $1\times10^{-3}$ Torr or less.

2. The method for manufacturing a magnetic recording medium according to claim 1, wherein the pattern transfer film is formed of the organic material represented by the general formula $Z-(X-Y)_n$, where Z represents a compound containing an aromatic skeleton or an alicyclic skeleton, Y represents a compound containing any one of an aromatic skeleton, an alicyclic skeleton, and a molecular skeleton containing H, $CH_3$, Si, or Sn, X represents a divalent coupling group, and n is an integer of 1 or more.

3. The method for manufacturing a magnetic recording medium according to claim 1, wherein the imprint stamper is made of a material selected from the group consisting of dielectric material, metal, metal alloy, and carbon material.

4. The method for manufacturing a magnetic recording medium according to claim 1, wherein a surface of the stamper is subjected to treatment of mold-releasing agent, and the treatment of mold-releasing agent is carried out using a silane coupling agent having a reactive group at the end of an alkyl chain or a fluorocarbon chain.

5. The method for manufacturing a magnetic recording medium according to claim 1, wherein the magnetic recording film and the pattern transfer-film are formed above both a first surface and a second surface opposite to the first surface of the substrate, and the transferring of the concavo-convex pattern is performed at the same time for the pattern transfer film formed above both the first and second surfaces of the substrate.

* * * * *